United States Patent
Nakajima et al.

(10) Patent No.: US 11,267,941 B2
(45) Date of Patent: Mar. 8, 2022

(54) ETHYLENE-VINYL ALCOHOL COPOLYMER COMPOSITION PELLETS, AND PRODUCTION METHOD FOR ETHYLENE-VINYL ALCOHOL COPOLYMER COMPOSITION PELLETS

(71) Applicant: MITSUBISHI CHEMICAL CORPORATION, Tokyo (JP)

(72) Inventors: Takuya Nakajima, Osaka (JP); Nobuyuki Yamamoto, Osaka (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 0 days.

(21) Appl. No.: 16/445,320

(22) Filed: Jun. 19, 2019

(65) Prior Publication Data

US 2019/0315933 A1  Oct. 17, 2019

Related U.S. Application Data

(63) Continuation of application No. PCT/JP2017/047093, filed on Dec. 27, 2017.

(30) Foreign Application Priority Data

Dec. 28, 2016  (JP) .............................. JP2016-255852
Dec. 28, 2016  (JP) .............................. JP2016-255853
Dec. 28, 2016  (JP) .............................. JP2016-255854
Dec. 28, 2016  (JP) .............................. JP2016-255855
Dec. 28, 2016  (JP) .............................. JP2016-255856

(51) Int. Cl.

| | | |
|---|---|---|
| *C08J 3/205* | (2006.01) | |
| *C08F 216/06* | (2006.01) | |
| *C08K 3/38* | (2006.01) | |
| *C08K 5/09* | (2006.01) | |
| *C08K 5/098* | (2006.01) | |
| *C08K 5/20* | (2006.01) | |

(52) U.S. Cl.
CPC ........... *C08J 3/2053* (2013.01); *C08F 216/06* (2013.01); *C08K 3/38* (2013.01); *C08K 5/09* (2013.01); *C08K 5/098* (2013.01); *C08K 5/20* (2013.01); *C08F 2800/10* (2013.01)

(58) Field of Classification Search
CPC ... C08J 3/2053; C08F 216/06; C08F 2800/10; C08K 3/38; C08K 5/09; C08K 5/098; C08K 5/20
USPC ........................................................ 524/228
See application file for complete search history.

(56) References Cited

U.S. PATENT DOCUMENTS

| | | |
|---|---|---|
| 6,174,949 B1 | 1/2001 | Ninomiya et al. |
| 2002/0035185 A1 | 3/2002 | Kawahara et al. |
| 2002/0045730 A1 | 4/2002 | Yanagida |
| 2002/0100997 A1 | 8/2002 | Kawahara et al. |
| 2004/0082690 A1 | 4/2004 | Kawahara et al. |
| 2004/0204549 A1* | 10/2004 | Yoshimi ................. B29C 48/00 525/330.6 |
| 2012/0172564 A1 | 7/2012 | Fujiwara et al. |
| 2013/0017383 A1 | 1/2013 | Tai et al. |
| 2015/0159005 A1* | 6/2015 | Nakazawa ............... B32B 27/08 426/412 |
| 2018/0346620 A1 | 12/2018 | Hori et al. |

FOREIGN PATENT DOCUMENTS

| | | |
|---|---|---|
| CN | 1287051 A | 3/2001 |
| CN | 1300788 A | 6/2001 |
| CN | 102549025 A | 7/2012 |
| CN | 103097129 A | 5/2013 |
| CN | 104350102 A | 2/2015 |
| CN | 108137821 A | 6/2018 |
| EP | 2269762 | 1/2011 |
| EP | 2554372 | 2/2013 |
| EP | 2730614 | 5/2014 |
| EP | 3369762 | 9/2018 |
| JP | 62-3866 | 1/1980 |
| JP | 3-11270 | 2/1991 |
| JP | H11-043571 A | 2/1999 |
| JP | 2000-043040 A | 2/2000 |
| JP | 2000-044756 | 2/2000 |
| JP | 2001-206999 | 7/2001 |
| JP | 2002-060413 A | 2/2002 |
| JP | 2002-060449 | 2/2002 |
| JP | 2002-060499 | 2/2002 |
| JP | 2002-284811 | 10/2002 |
| JP | 2003-138022 A | 5/2003 |
| JP | 2011-202052 | 10/2011 |
| WO | 2011/125739 A1 | 10/2011 |

OTHER PUBLICATIONS

International Search Report issued in Intl. Patent Application No. PCT/JP2017/047093, dated Mar. 20, 2018.
English Translation of the Iprp in Intl. Patent Application No. PCT/JP2017/047093, dated Jul. 2, 2019.
Supplemental European Search Report issued in European Patent Application No. 17885599.5, dated Nov. 14, 2019.
Singaporean Office Action issued in Singaporean patent application No. 11201905249T dated Dec. 16, 2019.
IN Office Action issued in in Patent Application No. 201917024427, dated Jan. 27, 2021.
Office Action issued in Japanese Patent Application No. 2017-252330, dated Jun. 1, 2021, English translation.

(Continued)

*Primary Examiner* — Hui H Chin
(74) *Attorney, Agent, or Firm* — Greenblum & Bernstein, P.L.C.

(57) ABSTRACT

Ethylene-vinyl alcohol copolymer composition pellets comprise: an ethylene-vinyl alcohol copolymer; a boron compound; and a predetermined amount of at least one fisheye-suppressing component, wherein pellet surface portions of the ethylene-vinyl alcohol copolymer composition pellets have a boron compound content of not higher than 1.7 ppm on a boron basis based on the weight of the pellets. The ethylene-vinyl alcohol copolymer composition pellets are capable of suppressing occurrence of fisheyes even if being used for formation of a single-layer ethylene-vinyl alcohol copolymer film.

9 Claims, No Drawings

(56) References Cited

OTHER PUBLICATIONS

Office Action issued in Chinese Patent Application No. 201780074648.5, dated May 7, 2021, English translation.
Office Action issued in Brazilian Patent Application No. BR112019009910-7, dated Aug. 24, 2021, English translation.

* cited by examiner

ETHYLENE-VINYL ALCOHOL COPOLYMER COMPOSITION PELLETS, AND PRODUCTION METHOD FOR ETHYLENE-VINYL ALCOHOL COPOLYMER COMPOSITION PELLETS

RELATED APPLICATION

This application is a continuation of International Application No. PCT/JP2017/047093, filed on Dec. 27, 2017, which claims priority to Japanese Patent Application No. 2016-255852, 2016-255853, 2016-255854, 2016-255855, and 2016-255856 filed on Dec. 28, 2016, the entire contents of each of which being hereby incorporated by reference.

TECHNICAL FIELD

The present disclosure relates to ethylene-vinyl alcohol copolymer (hereinafter sometimes referred to simply as "EVOH") composition pellets that can provide a film having very few fisheyes when being used for film formation. More specifically, the present disclosure relates to EVOH composition pellets that have a controlled boron compound content in their surfaces and contain a predetermined amount of a specific component, and to a production method for the EVOH composition pellets.

BACKGROUND ART

EVOH has crystalline portions formed due to firm hydrogen bonds between hydroxyl groups present in its molecular chains, and these crystalline portions prevent intrusion of gas such as oxygen from the outside. Therefore, the EVOH is excellent in gas barrier properties, e.g., oxygen barrier property. Taking advantage of the excellent gas barrier properties, the EVOH is formed into films, sheets, bottles, and other containers for use as food packaging materials, pharmaceutical product packaging materials, industrial chemical packaging materials, agricultural chemical packaging materials, and the like.

The EVOH is typically melt-formed and/or processed into a film form, a sheet form, a bottle form, a cup form, a tube form, a pipe form, and the like for practical applications. Therefore, the formability and the processability of the EVOH are important factors.

For improvement of the melt formability, PTL 1 discloses that a composition containing a melt-formable vinyl alcohol copolymer such as EVOH and boric acid or its salt and having a higher melt viscosity is effective for film formation by the melt forming, particularly for prevention of surging during the film formation.

Further, PTL 2 discloses that a multilayer structure produced by coextruding an EVOH treated with a boron compound and a polyolefin is excellent in adhesion between an EVOH layer and a polyolefin layer and is advantageous as a packaging material in an application field requiring the gas barrier property.

In PTL 2, the treatment with the boron compound is performed by adding the boron compound to a solution or a dispersion of the EVOH, and pellets of the resulting boron-containing EVOH are used as an extrusion material.

With recent increasing requirement for the appearance of an EVOH film or a multilayer structure to be used as a packaging material, improvement is required for eliminating fisheyes having a size of less than 0.1 mm.

PTL 3 discloses that, in the case of boron-containing EVOH pellets produced by incorporating a boron compound to an EVOH, there is a relationship between the water content of the pellets and the occurrence of fisheyes having a size of less than 0.1 mm, and the occurrence of fisheyes having a size of less than 0.1 mm can be suppressed by drying the pellets to a water content of 0.0001 to 2 wt. % and then bringing the resulting pellets into contact with water.

In Examples (Examples 1, 3, and 4) of PTL 3, EVOH pellets treated by addition of the boron compound are immersed in water, and then dried so as to have a controlled boron compound content (a boron content of 0.015 to 0.039 parts by weight based on 100 parts by weight of the EVOH (150 to 390 ppm)) and a controlled water content (a water content of 0.13 to 0.4 wt. %), and multilayer structures each including five layers of three types were produced by feeding the resulting EVOH pellets into a multilayer coextruder. The resulting multilayer structures were each evaluated for fisheyes by visually counting the number of fisheyes having a diameter of 0.01 to 0.1 mm (paragraphs [0038] to [0041]).

RELATED ART DOCUMENTS

Patent Documents

PTL 1: JP-B-SHO62(1987)-3866
PTL 2: JP-B-HEI3(1991)-11270
PTL 3: JP-A-2000-44756

SUMMARY

With recent increasingly stricter requirement for the appearance of the packaging material, it is desirable to more reliably suppress the occurrence of the fisheyes while ensuring the melt formability (e.g., while preventing the surging in the forming). Particularly, a single-layer film formed from the EVOH is liable to suffer from a greater number of larger fisheyes than a multilayer structure. Hence, there is a demand for EVOH pellets that are capable of suppressing the occurrence of fisheyes even if being used for the formation of the single-layer EVOH film. However, the arts disclosed in PTL 1 to PTL 3 described above are not satisfactory.

In view of the foregoing, it is an object of the present disclosure to provide EVOH composition pellets that contain a boron compound and a specific component, and are capable of suppressing the occurrence of fisheyes even if being used for the formation of the single-layer EVOH film, and to provide a production method for the EVOH composition pellets.

In view of the foregoing, the inventors conducted intensive studies and, as a result, found that, where the EVOH composition pellets have a lower boron compound content in surface portions thereof than conventional EVOH pellets and contain a predetermined amount of at least one component selected from the group consisting of a cinnamic acid component, an alkali metal, a conjugated polyene, a lubricant, and an alkali earth metal (hereinafter sometimes referred to collectively as "fisheye-suppressing component"), a product melt-formed from the EVOH composition pellets has a smaller number of fisheyes.

Further, a film (a layer or a film) produced by using the EVOH composition pellets of the present disclosure is excellent in formability and appearance even being a single-layer film and, of course, may be stacked with some other resin layers to provide a multilayer structure from the viewpoint of water resistance, strength, and the like.

According to a first aspect of the present disclosure, EVOH composition pellets are provided that contain an EVOH, a boron compound, and at least one component (fisheye-suppressing component) selected from the group consisting of:
(A) 0.0001 to 0.05 wt. % of a cinnamic acid component based on the weight of the EVOH composition pellets;
(B) not greater than 500 ppm of an alkali metal based on the weight of the EVOH composition pellets;
(C) not greater than 0.06 wt. % of a conjugated polyene based on the weight of the EVOH composition pellets;
(D) 0.001 to 0.15 wt. % of a lubricant based on the weight of the EVOH composition pellets; and
(E) not greater than 100 ppm of an alkali earth metal based on the weight of the EVOH composition pellets,
wherein pellet surface portions of the EVOH composition pellets have a boron compound content of not higher than 1.7 ppm on a boron basis based on the weight of the pellets.

According to a second aspect of the present disclosure, a method for producing EVOH composition pellets is provided, which includes bringing pellets of an EVOH into contact with a boron compound to incorporate the boron compound to the EVOH pellets, and rinsing the boron compound-incorporated EVOH pellets so that pellet surface portions of the EVOH composition pellets have a boron compound content of not higher than 1.7 ppm on a boron basis based on the weight of the EVOH composition pellets, and at least one selected from the group consisting of:
(A') bringing the EVOH pellets into contact with a cinnamic acid component so that the EVOH composition pellets have a cinnamic acid component content of 0.0001 to 0.05 wt. % based on the weight of the EVOH composition pellets;
(B') bringing the EVOH pellets into contact with an alkali metal so that the EVOH composition pellets have an alkali metal content of not higher than 500 ppm based on the weight of the EVOH composition pellets;
(C') bringing the EVOH pellets into contact with a conjugated polyene so that the EVOH composition pellets have a conjugated polyene content of not higher than 0.06 wt. % based on the weight of the EVOH composition pellets;
(D') bringing the EVOH pellets into contact with a lubricant so that the EVOH composition pellets have a lubricant content of 0.001 to 0.15 wt. % based on the weight of the EVOH composition pellets; and
(E') bringing the EVOH pellets into contact with an alkali earth metal so that the EVOH composition pellets have an alkali earth metal content of not higher than 100 ppm based on the weight of the EVOH composition pellets,
wherein the boron compound-incorporated EVOH pellets, after being dried, are brought into contact with a water/alcohol mixed solution containing water and an alcohol in a water-to-alcohol weight ratio (water/alcohol) of 80/20 to 0/100 or into contact with the alcohol in the rinsing of the boron compound-incorporated EVOH pellets.

The pellet surface portions of the EVOH composition pellets of the present disclosure have a boron compound content of not higher than 1.7 ppm on a boron basis based on the weight of the EVOH composition pellets, and the EVOH composition pellets contain the predetermined amount of the specific fisheye-suppressing component. Therefore, the EVOH composition pellets of the present disclosure have an excellent fisheye-suppressing effect while ensuring the melt formability.

Where the EVOH composition pellets have an overall boron compound content of 10 to 1,000 ppm on a boron basis based on the weight of the EVOH composition pellets, the EVOH composition pellets have an improved film forming capability due to a viscosity suitable for film formation. Thus, the EVOH composition pellets are excellent in fisheye-suppressing effect.

Where the weight ratio (surface boron compound content/overall boron compound content) between the boron compound content of the pellet surface portions of the EVOH composition pellets (on a boron basis) and the overall boron compound content of the EVOH composition pellets (on a boron basis) is not higher than $1.38 \times 10^{-2}$, the EVOH composition pellets are more excellent in fisheye-suppressing effect, and improve the appearance of the film.

Where the EVOH composition pellets of the present disclosure have a water content of 0.01 to 1 wt. %, the EVOH composition pellets are more excellent in fisheye-suppressing effect, and improve the appearance of the film.

The EVOH composition pellet production method includes: bringing the EVOH pellets into contact with the boron compound to incorporate the boron compound to the EVOH pellets; rinsing the boron compound-incorporated EVOH pellets to adjust the boron compound content of the pellet surface portions of the EVOH composition pellets to not higher than 1.7 ppm on a boron basis based on the weight of the EVOH composition pellets; and incorporating a predetermined amount of at least one of the fisheye-suppressing components to the EVOH pellets; wherein the boron compound-incorporated EVOH pellets, after being dried, are brought into contact with the water/alcohol mixed solution containing water and the alcohol in a water-to-alcohol weight ratio (water/alcohol) of 80/20 to 0/100 or into contact with the alcohol in the rinsing of the boron compound-incorporated EVOH pellets. Thus, the resulting EVOH composition pellets contain the predetermined amount of the fisheye-suppressing component, and the pellet surface portions of the EVOH composition pellets have a reduced boron compound content. Therefore, a product melt-formed from the EVOH composition pellets is excellent in melt formability and fisheye-suppressing effect.

DESCRIPTION OF EMBODIMENTS

Preferred embodiments of the present disclosure will hereinafter be described in detail. It should be understood that these preferred embodiments are illustrative but not limitative.

In the present disclosure, the amount of the boron compound contained in the EVOH composition pellets is determined on a boron basis, and referred to as "(overall) boron compound content (on a boron basis)" or simply as "boron content."

Prior to description of the EVOH composition pellets of the present disclosure, formulation ingredients of the EVOH composition pellets, and a method for producing the EVOH pellets before the boron compound and the fisheye-suppressing component are incorporated to the EVOH pellets will be described.

<EVOH>

The EVOH for the EVOH composition pellets of the present disclosure is typically a resin prepared by saponifying a copolymer of ethylene and a vinyl ester monomer (ethylene-vinyl ester copolymer), or a water-insoluble thermoplastic resin generally referred to as an ethylene-vinyl alcohol copolymer or a saponified ethylene-vinyl ester copolymer. A known polymerization method such as solution polymerization method, suspension polymerization method or emulsion polymerization method may be utilized for polymerization for the preparation of the EVOH. In general, a solution polymerization method using a lower alcohol (e.g., methanol) as a solvent, particularly preferably using methanol as a solvent, is utilized. The saponification of the resulting ethylene-vinyl ester copolymer may be achieved by a known method.

The EVOH thus prepared mainly contains an ethylene-derived structural unit and a vinyl alcohol structural unit, and further contains a small amount of a vinyl ester structural unit left unsaponified as required.

Vinyl acetate is typically used as the vinyl ester monomer because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl ester monomers may be typically each used alone but, as required, may be used in combination.

Ethylene and the vinyl ester monomer described above are typically prepared by using a material derived from petroleum such as naphtha. Monomers prepared from materials derived from natural gas such as shale gas, and plant-derived materials such as obtained by refining sugar and starch contained in sugar cane, sugar beet, corn, potato, and the like, and cellulose contained in rice, wheat, millet, grass, and the like are also usable.

The EVOH to be used in the present disclosure typically has an ethylene structural unit content of 20 to 60 mol %, preferably 25 to 50 mol %, particularly preferably 27 to 48 mol %, as measured in conformity with ISO14663. If the ethylene structural unit content is excessively low, the EVOH tends to be poorer in high-humidity gas barrier property and melt formability. If the ethylene structural unit content is excessively high, on the other hand, the EVOH tends to be poorer in gas barrier property.

The saponification degree of the vinyl ester component in the EVOH is typically 90 to 100 mol %, preferably 95 to 100 mol %, particularly preferably 99 to 100 mol %, as measured in conformity with JIS K6726 (by using a water/methanol solvent). If the saponification degree is excessively low, the EVOH tends to be poorer in gas barrier property, heat stability, moisture resistance, and the like.

The EVOH typically has a melt flow rate (MFR) of 0.5 to 100 g/10 minutes, preferably 1 to 50 g/10 minutes, particularly preferably 2 to 35 g/10 minutes, as measured at 210° C. with a load of 2160 g. If the MFR is excessively high, the EVOH tends to have unstable film formability. If the MFR is excessively low, the EVOH tends to have an excessively high viscosity, making the melt extrusion difficult.

The EVOH to be used in the present disclosure may further contain a structural unit derived from any of the following comonomers in an amount (e.g., not greater than 10 mol %) that does not impair the effects of the present disclosure.

The comonomers include: olefins such as propylene, 1-butene, and isobutene; hydroxyl-containing α-olefins such as 3-buten-1-ol, 3-butene-1,2-diol, 4-penten-1-ol, and 5-hexene-1,2-diol, and esterification products of these hydroxyl-containing α-olefins; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyloxy-2-methylenepropane, and 1,3-dibutyronyloxy-2-methylenepropane, and derivatives such as acylation products of these hydroxyalkyl vinylidene diacetates; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids having a carbon number of 1 to 18; acrylamide compounds such as acrylamide, N-alkyl acrylamides having a carbon number of 1 to 18, N,N-dimethyl acrylamide, 2-acrylamidopropane sulfonic acid and its salts, and acrylamidopropyldimethylamine and its acid salts and quaternary salts; methacrylamide compounds such as methacrylamide, N-alkyl methacrylamides having a carbon number of 1 to 18, N,N-dimethyl methacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers such as alkyl vinyl ethers, hydroxyalkyl vinyl ethers, and alkoxyalkyl vinyl ethers having a carbon number of 1 to 18; halogenated vinyl compounds such as vinyl chloride, vinylidene chloride, vinyl fluoride, vinylidene fluoride, and vinyl bromide; vinylsilanes such as trimethoxyvinylsilane; allyl acetate and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

Particularly, an EVOH prepared by the copolymerization with a hydroxyl-containing α-olefin is preferred because of its excellent secondary formability, and an EVOH having a primary hydroxyl group in its side chain is preferred. Particularly, an EVOH having a 1,2-diol structure in its side chain is preferred.

The EVOH having the 1,2-diol structure in its side chain contains a 1,2-diol structural unit in its side chain. More specifically, the 1,2-diol structural unit is a structural unit represented by the following general formula (1):

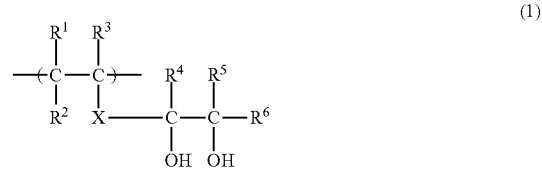

(1)

In the above general formula (1), $R^1$ to $R^6$ are each independently a hydrogen atom or an organic group, and X is a single bond or a bonding chain.

Examples of the organic group in the 1,2-diol structural unit represented by the above general formula (1) include: saturated hydrocarbon groups such as methyl group, ethyl group, n-propyl group, isopropyl group, n-butyl group, isobutyl group, and tert-butyl group; aromatic hydrocarbon groups such as phenyl group and benzyl group; and halogen atoms, hydroxyl group, acyloxy groups, alkoxycarbonyl groups, carboxyl group, and sulfonic acid group.

$R^1$ to $R^3$ are each preferably a saturated hydrocarbon group typically having a carbon number of 1 to 30, particularly preferably 1 to 15, more preferably 1 to 4, or the hydrogen atom, most preferably the hydrogen atom. Further, $R^4$ to $R^6$ are each preferably an alkyl group typically having a carbon number of 1 to 30, particularly preferably 1 to 15, more preferably 1 to 4, or the hydrogen atom, most preferably the hydrogen atom. Particularly, it is most preferred that $R^1$ to $R^6$ are all hydrogen atoms.

In the structural unit represented by the above general formula (1), X is typically a single bond.

As long as the effects of the present disclosure are not impaired, X may be a bonding chain. The bonding chain is not particularly limited, but examples of the bonding chain include: hydrocarbon chains such as alkylenes, alkenylenes, alkynylenes, phenylene, and naphthylene (which may be substituted with a halogen such as fluorine, chlorine or bromine); ether bond-containing structures such as —O—, —(CH$_2$O)$_m$—, —(OCH$_2$)$_m$—, and —(CH$_2$O)$_m$CH$_2$—; carbonyl-containing structures such as —CO—, —COCO—, —CO(CH$_2$)$_m$CO—, and —CO(C$_6$H$_4$)CO—; heteroatom-containing structures including sulfur atom-containing structures such as —S—, —CS—, —SO—, and —SO$_2$—, nitrogen atom-containing structures such as —NR—, —CONR—, —NRCO—, —CSNR—, —NRCS—, and —NRNR—, and phosphorus atom-containing structures such as —HPO$_4$—; and metal atom-containing structures including silicon atom-containing structures such as —Si(OR)$_2$—, —OSi(OR)$_2$—, and —OSi(OR)$_2$O—, titanium atom-containing structures such as —Ti(OR)$_2$—, —OTi(OR)$_2$—, and —OTi(OR)$_2$O—, and aluminum atom-containing structures such as —Al(OR)—, —OAl(OR)—, and —OAl(OR)O—.

In the above bonding chains, m is a natural number, typically 1 to 30, preferably 1 to 15, more preferably 1 to 10. Of the above bonding chains, —CH$_2$OCH$_2$— or a hydrocarbon chain having a carbon number of 1 to 10 is preferred in terms of stability during production or during use. Further, a hydrocarbon chain having a carbon number of 1 to 6 is preferred, and a hydrocarbon chain having a carbon number of 1 is particularly preferred.

In the 1,2-diol structural unit represented by the above general formula (1), it is most preferred that $R^1$ to $R^6$ are all hydrogen atoms and X is a single bond. That is, a structural unit represented by the following general formula (1a) is most preferred.

(1a)

Where the 1,2-diol structural unit represented by the above general formula (1) is contained, the content of the 1,2-diol structural unit is typically 0.1 to 20 mol %, preferably 0.1 to 15 mol %, particularly preferably 0.1 to 10 mol %.

The EVOH to be used in the present disclosure may be a post-modified EVOH such as an urethanized, acetalized, cyanoethylated or oxyalkylenated EVOH.

<Boron Compound>

The fisheyes occur supposedly because the tackiness of the EVOH is locally increased in the presence of agglomerates of the boron compound on the boron compound-incorporated EVOH pellets. Where the boron compound-incorporated EVOH pellets are used for formation of a single layer film, the boron compound present in the pellet surface portions is liable to agglomerate in contact with metal parts of a forming machine. This is also regarded as the cause of the fisheyes. In the present disclosure, the boron compound content of the pellet surface portions of the EVOH composition pellets is controlled to not higher than a predetermined level, whereby the agglomeration of the boron compound is prevented to provide the fisheye-suppressing effect.

The pellet surface portions of the EVOH composition pellets of the present disclosure have a boron compound content of not higher than 1.7 ppm, preferably not higher than 1.6 ppm, more preferably not higher than 1.5 ppm, on a boron basis based on the weight of the EVOH composition pellets. The lower limit of the boron compound content is not particularly limited. Where the overall boron compound content of the EVOH composition pellets (on a boron basis) falls within a range to be described later, the lower limit of the boron compound content of the pellet surface portions is typically not less than 1 ppb, preferably not less than 50 ppb, more preferably not less than 100 ppb.

If the boron compound content of the pellet surface portions (on a boron basis) is excessively high, the fisheyes are liable to occur. This will result in poorer film appearance and poorer film formability.

In the present disclosure, "the boron compound content of the pellet surface portions" means the amount of the boron compound present in near-surface portions of the EVOH composition pellets out of the boron compound contained in the overall EVOH composition pellets. More specifically, the boron compound content of the pellet surface portions is determined by immersing 4 g of the EVOH composition pellets of the present disclosure in 20 mL of methanol at 30° C. in a stationary state for 6 hours, then measuring the amount of the boron compound dissolved in a resulting methanol solution by means of an inductively coupled plasma mass spectrometer (ICP-MS), and dividing the boron compound amount by the weight (4 g) of the EVOH composition pellets. The boron compound present in the pellet surface portions includes the boron compound simply adhering to the surfaces of the EVOH pellets, the boron compound bleeding onto the surfaces of the EVOH pellets, and the like.

"The boron compound content of the pellet surface portions" is distinguished from the amount of the boron compound contained in the overall EVOH composition pellets (the overall boron compound content of the pellets).

The overall boron compound content of the EVOH composition pellets of the present disclosure is preferably 10 to 1,000 ppm, more preferably 20 to 500 ppm, still more preferably 30 to 140 ppm, on a boron basis based on the weight of the pellets. If the overall boron compound content of the EVOH composition pellets is excessively low, the pellets tend to be poorer in film formability with a lower melt viscosity. Particularly, inflation film formation tends to be difficult. Therefore, the boron compound is preferably incorporated to the EVOH pellets so that the EVOH composition pellets have a boron content of at least about 10 ppm.

The amount of the boron compound contained in the EVOH composition pellets (overall boron compound content (on a boron basis)) is determined by treating the pellets together with concentrated nitric acid by a microwave decomposition method, diluting the resulting solution with purified water to a predetermined volume to prepare a sample solution, and measuring the amount of boron contained in the sample solution by means of an inductively coupled plasma emission spectrometer (ICP-AES).

In the EVOH composition pellets of the present disclosure, the weight ratio (surface boron compound content/overall boron compound content) between the boron compound content of the surface portions (on a boron basis) and the overall boron compound content of the EVOH composition pellets (on a boron basis) is preferably not greater than $1.38 \times 10^{-2}$ more preferably not greater than $1.35 \times 10^{-2}$, still more preferably not greater than $1.30 \times 10^{-2}$. If the ratio is excessively high, the EVOH composition pellets are more liable to cause the fisheyes, thereby deteriorating the film appearance. The lower limit of the weight ratio is typically $1 \times 10^{-7}$.

In the present disclosure, boric acid or its metal salt is used as the boron compound. Examples of the boron compound include sodium borates (sodium metaborate, sodium diborate, sodium tetraborate, sodium pentaborate, sodium hexaborate, sodium octaborate, and the like), potassium borates (potassium metaborate, potassium tetraborate, potassium pentaborate, potassium hexaborate, potassium octaborate, and the like), lithium borates (lithium metaborate, lithium tetraborate, lithium pentaborate, and the like), calcium borate, barium borates (barium orthoborate, barium metaborate, barium diborate, barium tetraborate, and the like), magnesium borates (magnesium orthoborate, magnesium diborate, magnesium metaborate, trimagnesium tetraborate, pentamagnesium tetraborate, and the like), manganese borates (manganese borate, manganese metaborate, manganese tetraborate, and the like), cobalt borate, zinc borates (zinc tetraborate, zinc metaborate, and the like), cadmium borates (cadmium orthoborate, cadmium tetraborate, and the like), silver borates (silver metaborate, silver tetraborate, and the like), copper borates (cupric borate, copper metaborate, copper tetraborate, and the like), nickel borates (nickel orthoborate, nickel diborate, nickel tetraborate, nickel octaborate, and the like), aluminum potassium borate, ammonium borates (ammonium metaborate, ammonium tetraborate, ammonium pentaborate, ammonium octaborate, and the like), lead borates (lead metaborate, lead hexaborate, and the like), bismuth borate, and boric acid salt minerals such as borax, kernite, inyoite, kotoite, suanite, and szaibelyite, among which borax and boric acid are preferred. These may be used alone or in combination. Where the boron compound is incorporated in the form of an alkali metal salt or an alkali earth metal salt to the EVOH pellets, the amount of the alkali metal salt or the alkali earth metal salt is counted in the alkali metal content or the alkali earth metal content of the EVOH composition pellets of the present disclosure.

The EVOH composition pellets of the present disclosure contain, in addition to the above boron compound, at least one component selected from the following components (A) to (E) as the fisheye-suppressing components:

(A) 0.0001 to 0.05 wt. % of a cinnamic acid component based on the weight of the EVOH composition pellets;

(B) not greater than 500 ppm of an alkali metal based on the weight of the EVOH composition pellets;

(C) not greater than 0.06 wt. % of a conjugated polyene based on the weight of the EVOH composition pellets;

(D) 0.001 to 0.15 wt. % of a lubricant based on the weight of the EVOH composition pellets; and (E) not greater than 100 ppm of an alkali earth metal based on the weight of the EVOH composition pellets.

«(A) Use of Cinnamic Acid Component as Fisheye-Suppressing Component»

The use of the cinnamic acid component as the fisheye-suppressing component in the present disclosure will be described.

In general, if the EVOH stagnates in an extruder during the melt forming, the EVOH is susceptible to degradation and gelation. When the stagnating EVOH is extruded, fisheyes are liable to occur. The cinnamic acid component serves to moderately crosslink the EVOH to increase the viscosity of the EVOH. Therefore, where the predetermined amount of the cinnamic acid component is added to the EVOH and the resulting EVOH is used for the film formation, the viscosity of the EVOH is moderately increased in the extruder, and the EVOH is pushed out by the higher-viscosity EVOH subsequently extruded without stagnating in the extruder. This supposedly suppresses the occurrence of the fisheyes.

If an excess amount of the cinnamic acid component is added, the crosslinking reaction will be excessively promoted to excessively increase the viscosity of the EVOH, thereby increasing the fisheyes.

The cinnamic acid component content of the EVOH composition pellets of the present disclosure is 0.0001 to 0.05 wt. %, preferably 0.001 to 0.04 wt. %, more preferably 0.005 to 0.035 wt. %, based on the weight of the overall EVOH composition pellets. If the cinnamic acid component content is excessively low, the fisheye-suppressing effect will be reduced. If the cinnamic acid component content is excessively high, the EVOH is liable to have an excessively high viscosity and conversely suffer from the occurrence of the fisheyes and poorer extrudability.

In the present disclosure, the cinnamic acid component is not limited to cinnamic acid, and other examples of the cinnamic acid component include cinnamic acid derivatives such as cinnamic acid esters, alkoxyl-containing cinnamic acid, cinnamamides, and cinnamic acid salts, which may be used alone or in combination. Of these, cinnamic acid is preferred. Where plural types of cinnamic acid components are used, the cinnamic acid component content is the total amount of the cinnamic acid components.

"The cinnamic acid component content" of the EVOH composition pellets of the present disclosure means the amount of the cinnamic acid component contained in the surfaces of the EVOH composition pellets and/or within the EVOH composition pellets, and is determined, for example, in the following manner.

<Determination of Cinnamic Acid Component Content>

Where the cinnamic acid component is contained only in the surfaces of the EVOH composition pellets, the amount of the cinnamic acid component added to the surfaces of the EVOH pellets may be regarded as the cinnamic acid component content. Where the cinnamic acid component is contained within the EVOH composition pellets, 1 g of the EVOH composition pellets are immersed in 9 mL of extraction liquid (e.g., methanol for cinnamic acid) at 25° C., and subjected to an ultrasonic treatment for 2 hours. Then, the resulting extraction liquid is analyzed by an LC/MS/MS analysis for determination of the cinnamic acid component content.

«(B) Use of Alkali Metal as Fisheye-Suppressing Component»

Next, the use of the alkali metal as the fisheye-suppressing component in the present disclosure will be described.

As described above, if the EVOH stagnates in the extruder, the EVOH is susceptible to degradation and gelation. When the stagnating EVOH is extruded, the fisheyes are liable to occur. The alkali metal has a viscosity reducing effect on the EVOH. This supposedly suppresses the increase in viscosity, which may otherwise occur due to the crosslinking when the EVOH stagnates in the extruder, thereby suppressing the occurrence of the fisheyes.

Further, the added alkali metal interacts with not greater than the predetermined amount of the boron compound present in the surfaces of the EVOH composition pellets, thereby suppressing the agglomeration of the boron compound. This supposedly suppresses the occurrence of the fisheyes attributable to the boron compound.

The alkali metal content of the EVOH composition pellets of the present disclosure is not higher than 500 ppm, preferably not higher than 400 ppm, more preferably not higher than 300 ppm, based on the weight of the EVOH composition pellets. The lower limit of the alkali metal content is 10 ppm. If the alkali metal content is excessively low, the fisheye-suppressing effect provided by reducing the viscosity of the EVOH will be reduced. If the alkali metal content is excessively high, the fisheyes will be increased, because an alkali metal salt is liable to be insufficiently dispersed in the EVOH to agglomerate. Further, the decomposition of the EVOH excessively proceeds, resulting in coloration of the EVOH and odor emanation from the EVOH.

Examples of the alkali metal to be used in the present disclosure include lithium, sodium, potassium, rubidium, and cesium, which may be used alone or in combination. Of these, sodium and potassium are preferred, and sodium is particularly preferred. In the present disclosure, the alkali metal content is on a metal basis. Where two or more types of alkali metals are used in combination, the alkali metal content is the total amount of the alkali metals on a metal basis.

Exemplary alkali metal sources for incorporating the alkali metal to the EVOH composition pellets of the present disclosure include alkali metal compounds such as alkali metal oxides, alkali metal hydroxides, and alkali metal salts. These alkali metal compounds are preferably water-soluble. Particularly, the alkali metal salts are preferred for dispersibility.

The alkali metal compounds to be used in the present disclosure preferably exclude inorganic lamellar compounds and double salts from the viewpoint of economy and dispersibility.

Where an alkali metal salt is used as the alkali metal compound, for example, the alkali metal salt may be present in an ionized form or in the form of an alkali metal complex with a resin or other ligands.

Examples of the alkali metal salts include: inorganic salts such as carbonates, hydrogen carbonates, phosphates, borates, sulfates, and chlorides of the alkali metals; and carboxylates including C2 to C11 monocarboxylates such as acetates, butyrates, propionates, enanthates, and caprates of the alkali metals, C2 to C11 dicarboxylates such as oxalates, malonates, succinates, adipates, suberates, and sebacates of the alkali metals, and carboxylates such as provided by bonding the alkali metals to terminal carboxyl groups of the EVOH polymer. These may be used alone or in combination.

Of these, the carboxylates of the alkali metals are preferred, and the C2 to C11 carboxylates of the alkali metals are more preferred. Further, aliphatic C2 to C11 carboxylates of the alkali metals are preferred, and aliphatic C2 to C6 monocarboxylates of the alkali metals are more preferred. Particularly, the acetates of the alkali metals are preferred.

The alkali metal compounds typically have a molecular weight of 20 to 10,000, preferably 20 to 1,000, particularly preferably 20 to 500.

"The alkali metal content" of the EVOH composition pellets of the present disclosure means the amount of the alkali metal contained in the surfaces of the EVOH composition pellets and/or within the EVOH composition pellets, and is determined, for example, in the following manner.
<Determination of Alkali Metal Content>

Where the alkali metal is contained in the surfaces of the EVOH composition pellets, the alkali metal amount of the alkali metal compound added to the surfaces of the EVOH pellets may be regarded as the alkali metal content. Where the alkali metal compound is contained within the EVOH composition pellets, the alkali metal content is determined, for example, by ashing the EVOH composition pellets in a dry state, dissolving the resulting ash in an hydrochloric acid aqueous solution, analyzing the resulting hydrochloric acid aqueous solution by means of an inductively coupled plasma emission spectrometer (ICP-AES), fitting the result of the analysis to a calibration line prepared by using standard solutions to determine an alkali metal amount, and converting the alkali metal amount to the overall alkali metal content of the EVOH composition pellets.

«(C) Use of Conjugated Polyene as Fisheye-Suppressing Component»

Next, the use of the conjugated polyene as the fisheye-suppressing component in the present disclosure will be described.

It is generally known that, if the EVOH is heated to a high temperature in the extruder, radicals occur in EVOH molecules to thereby deteriorate the EVOH, resulting in the occurrence of the fisheyes. On the other hand, the conjugated polyene has a plurality of double bonds in its molecule, functioning to capture the radicals that may otherwise cause the deterioration of the EVOH. Further, the conjugated polyene has a relatively low molecular polarity because of its structure containing the double bonds. Therefore, the conjugated polyene is less liable to interact with the highly polar EVOH to be thereby expelled from the inside of the EVOH and bleed onto the EVOH surface during film formation. The conjugated polyene thus bleeding prevents the agglomeration of the boron compound present in the near-surface portions of the EVOH composition pellets. This supposedly suppresses the occurrence of the fisheyes attributable to the boron compound.

The conjugated polyene content of the EVOH composition pellets of the present disclosure is not higher than 0.06 wt. %, preferably not higher than 0.05 wt. %, more preferably not higher than 0.04 wt. %, based on the weight of the overall EVOH composition pellets. The lower limit of the conjugated polyene content is 0.001 wt. %. If the conjugated polyene content is excessively low, the fisheye-suppressing effect provided by capturing the radicals will be reduced. If the conjugated polyene content is excessively high, the amount of the conjugated polyene bleeding to the pellet surface portions will be increased, resulting in instability of the pH balance in the pellet surface portions. This will increase the fisheyes in the formed film.

The conjugated polyene to be used in the present disclosure is a compound containing so-called conjugated double bonds, i.e., having a structure such that carbon-carbon double bonds and carbon-carbon single bonds are alternately connected to each other and the number of the carbon-carbon double bonds is two or more. The conjugated polyene may be a conjugated diene having a structure such that two carbon-carbon double bonds and one carbon-carbon single bond are alternately connected to each other, a conjugated triene having a structure such that three carbon-carbon double bonds and two carbon-carbon single bonds are alternately connected to each other, or a conjugated polyene having a structure such that more than three carbon-carbon double bonds and more than two carbon-carbon single bonds are alternately connected to each other. However, a conjugated polyene having eight or more conjugated carbon-carbon double bonds is colored, so that a product formed from an EVOH composition containing such a conjugated polyene is liable to be colored. Therefore, a conjugated polyene having seven or less conjugated carbon-carbon double bonds is preferred. The conjugated polyene may have a structure such that plural sets of conjugated double bonds each including two or more carbon-carbon double bonds are present in an unconjugated state in its molecule. Tung oil containing three conjugated trienes in its molecule is also an example of the conjugated polyene.

Examples of the conjugated polyene include: conjugated dienes, such as isoprene, 2,3-dimethyl-1,3-butadiene, 2,3-diethyl-1,3-butadiene, 2-tert-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnesene, cembrene, sorbic acid compounds (sorbic acid, sorbic acid esters, and sorbic acid salts), and abietic acid, each having a conjugated structure containing two carbon-carbon double bonds; conjugated trienes, such as 1,3,5-hexatriene, 2,4,6-octatriene-1-carboxylic acid, eleostearic acid, tung oil, and cholecalciferol, each having a conjugated structure containing three carbon-carbon double bonds; and conjugated polyenes, such as cyclooctatetraene, 2,4,6,8-decatetraene-1-carboxylic acid, retinol, and retinoic acid, each having a conjugated structure containing four or more carbon-carbon double bonds. Of these conjugated polyenes, 1,3-pentadiene, myrcene, and farnesene each have a plurality of stereoisomers, which are all usable. Two or more of these conjugated polyenes may be used in combination.

Of these, the conjugated polyenes having a carboxyl group are preferred because of their higher water affinity. Particularly, the sorbic acid compounds are preferred, and sorbic acid is particularly preferred.

The conjugated polyene content of the EVOH composition pellets of the present disclosure may be determined, for example, by the following method.

<Determination of Conjugated Polyene Content>

The conjugated polyene content is determined, for example, by pulverizing the EVOH composition pellets, extracting the conjugated polyene from the pellets with the use of a proper solvent, and analyzing the resulting extraction solvent by liquid chromatography to measure the amount of the conjugated polyene in the extraction solvent.

«(D) Use of Lubricant as Fisheye-Suppressing Component»

Next, the use of the lubricant as the fisheye-suppressing component in the present disclosure will be described.

In general, if the EVOH pellets are fed into the extruder with no lubricant added thereto, the EVOH pellets are liable to be poorly bit by a screw of the extruder due to higher frictional forces on the pellet surfaces to thereby gradually stagnate when being fed into the extruder. The stagnating EVOH pellets are constantly exposed to a high temperature to be thereby thermally degraded. This supposedly increases the fisheyes. Therefore, the addition of the lubricant to the EVOH pellets reduces the friction between the EVOH pellets and surfaces of the screw, and makes it possible to smoothly feed the EVOH pellets into the extruder. Thus, the EVOH pellets are less liable to be thermally degraded. This supposedly suppresses the fisheyes. When the EVOH pellets are not bit by the screw, the boron compound present in the pellet surface portions are more liable to agglomerate because the pellet surface portions are more easily heated. This supposedly increases the fisheyes.

The lubricant content of the EVOH composition pellets of the present disclosure is 0.001 to 0.15 wt. %, preferably 0.003 to 0.12 wt. %, more preferably 0.005 to 0.10 wt. %, based on the weight of the EVOH composition pellets. If the lubricant content is excessively low, the friction between the screw surfaces of the extruder and the EVOH composition pellets is increased, making it impossible to stably feed the pellets. This will increase the fisheyes. If the lubricant content is excessively high, the lubricant will be insufficiently dispersed to agglomerate. This will conversely increase the fisheyes. Further, the friction between the EVOH composition pellets and the screw surfaces will be reduced, making it impossible to stably feed the pellets. This will increase the fisheyes.

Examples of the lubricant to be used in the present disclosure include: higher fatty acids such as lauric acid, myristic acid, palmitic acid, stearic acid, behenic acid, and oleic acid; metal salts of the higher fatty acids such as aluminum salts, calcium salts, zinc salts, magnesium salts, and barium salts of the higher fatty acids; esters of the higher fatty acids such as methyl esters, isopropyl esters, butyl esters, and octyl esters of the higher fatty acids; and amides of the higher fatty acids including saturated higher fatty acid amides such as stearamide and behenamide, unsaturated higher fatty acid amides such as oleamide and erucamide, and bis-higher fatty acid amides such as ethylene bis-stearamide, ethylene bis-oleamide, ethylene bis-erucamide, and ethylene bis-lauramide. Other examples of the lubricant include: low-molecular-weight polyolefins such as low-molecular-weight polyethylenes and low-molecular-weight polypropylenes each having a molecular weight of about 500 to about 10,000, and acid modification products of these low-molecular-weight polyolefins; higher alcohols, ester oligomers, and fluorinated ethylene resins. These may be used alone or in combination. Of the above compounds for use as the lubricant, the higher fatty acids are preferred for extrusion stability and commercial availability. The higher fatty acids typically each have a carbon number of 12 to 25, preferably 12 to 23, particularly preferably 15 to 20, in a molecule thereof. Of the above compounds for use as the lubricant, the higher fatty acids typically each have a valence of 1 to 5, preferably 1 to 3, particularly preferably 1 to 2, from the viewpoint of the extrusion stability and the commercial availability. Here, the valence means the number of structures derived from a higher fatty acid in one molecule of the compound to be used as the lubricant. Where a bis-stearamide is used as the lubricant, for example, two structures each derived from a C18 higher fatty acid molecule are contained in a molecule of the bis-stearamide and, therefore, the bis-stearamide is regarded as an amide of the C18 higher fatty acid having a higher fatty acid valence of 2. Of these, the higher fatty acids, the metal salts of the higher fatty acids, the esters of the higher fatty acids, and the amides of the higher fatty acids are preferred, and the metal salts of the higher fatty acids and the amides of the higher fatty acids are particularly preferred. Further, the amides of the higher fatty acids are more preferred for extrusion stability.

The lubricant may be in any form, e.g., a solid form (a powdery form, a particulate form or a flake form), a semi-solid form, a liquid form, a paste form, a solution form, an emulsion form (an aqueous dispersion form) or the like. Particularly, the powdery lubricant is preferred. The powdery lubricant typically has a particle diameter of 0.1 to 100 μm, preferably 1 to 75 μm, particularly preferably 5 to 50 μm.

"The lubricant content" of the EVOH composition pellets of the present disclosure means the amount of the lubricant contained in the surfaces of the EVOH composition pellets and/or within the EVOH composition pellets, and is determined, for example, by the following method.

<Determination of Lubricant Content>

Where the lubricant is added to the EVOH pellets to adhere to the surfaces of the EVOH pellets, the amount of the added lubricant may be regarded as the lubricant content. Where the lubricant is contained within the EVOH composition pellets and the lubricant is a higher fatty acid amide, for example, the lubricant content of the EVOH composition pellets is determined by measuring the total nitrogen amount of the EVOH composition pellets by means of a total trace nitrogen analyzer, and converting the total nitrogen amount into the lubricant content.

«(E) Use of Alkali Earth Metal as Fisheye-Suppressing Component»

Next, the use of the alkali earth metal as the fisheye-suppressing component in the present disclosure will be described.

As described above, if the EVOH stagnates in the extruder during the melt forming, the EVOH is susceptible to degradation and gelation. When the stagnating EVOH is extruded, the fisheyes are liable to occur. However, the alkali earth metal has a viscosity reducing effect on the EVOH. This supposedly suppresses the increase in viscosity that may otherwise occur due to crosslinking when the EVOH stagnates in the extruder, thereby suppressing the occurrence of the fisheyes. Further, the added alkali earth metal interacts with the boron compound present in the surfaces of the EVOH composition pellets to thereby suppress the agglomeration of the boron compound present in the surfaces of the EVOH composition pellet. This supposedly suppresses the occurrence of the fisheyes attributable to the boron compound.

The alkali earth metal content of the EVOH composition pellets of the present disclosure is not higher than 100 ppm, preferably not higher than 80 ppm, more preferably not higher than 50 ppm, based on the weight of the EVOH composition pellets. The lower limit of the alkali earth metal content is 1 ppm. If the alkali earth metal content is excessively low, the fisheye-suppressing effect provided by reducing the viscosity of the EVOH will be reduced. If the alkali earth metal content is excessively high, the fisheyes will be increased, because an alkali earth metal salt is liable to be insufficiently dispersed in the EVOH to agglomerate. Further, the EVOH tends to be colored and emanate odor.

Examples of the alkali earth metal to be used in the present disclosure include beryllium, magnesium, calcium, strontium, barium, and radium, which may be used alone or in combination. Of these, calcium is preferred. In the present disclosure, the alkali earth metal content is on a metal basis. Where two or more types of alkali earth metals are used, the alkali earth metal content is the total amount of the alkali earth metals on a metal basis.

Exemplary alkali earth metal sources for incorporating the alkali earth metal to the EVOH composition pellets of the present disclosure include alkali earth metal compounds such as alkali earth metal oxides, alkali earth metal hydroxides, and alkali earth metal salts. Particularly, the alkali earth metal salts are preferred for dispersibility. The alkali earth metal compounds to be used in the present disclosure preferably exclude inorganic lamellar compounds and double salts from the viewpoint of economy and dispersibility.

Examples of the alkali earth metal salts include: inorganic salts such as carbonates, hydrogen carbonates, phosphates, borates, sulfates, and chlorides of the alkali earth metals; and organic acid salts including C2 to C11 monocarboxylates such as acetates, butyrates, propionates, enanthates, and caprates of the alkali earth metals, C2 to C11 dicarboxylates such as oxalates, malonates, succinates, adipates, suberates, and sebacates of the alkali earth metals, and monocarboxylates having a carbon number of not less than such as laurates, palmitates, stearates, 12-hydroxystearates, behenates, and montanates of the alkali earth metals. These may be used alone or in combination. Of these, the phosphates of the alkali earth metals are preferred. Where plural types of alkali earth metals are used, the alkali earth metal content is the total amount of the alkali earth metals.

"The alkali earth metal content" of the EVOH composition pellets of the present disclosure means the amount of the alkali earth metal contained in the surfaces of the EVOH composition pellets and/or within the EVOH composition pellets, and is determined, for example, by the following method.

<Determination of Alkali Earth Metal Content>

Where the alkali earth metal is added to the EVOH pellets to adhere to the surfaces of the EVOH pellets, the amount of the added alkali earth metal may be regarded as the alkali earth metal content. Where the alkali earth metal is contained within the EVOH composition pellets, the alkali earth metal content is determined, for example, by ashing the EVOH composition pellets in a dry state, dissolving the resulting ash in a hydrochloric acid aqueous solution, analyzing the resulting hydrochloric acid aqueous solution by means of an inductively coupled plasma emission spectrometer (ICP-AES), fitting the result of the analysis to a calibration line prepared by using standard solutions to determine an alkali earth metal amount, and converting the alkali earth metal amount to an overall alkali earth metal content of the EVOH composition pellets.

Next, a method for producing the EVOH pellets and a method for producing the EVOH composition pellets of the present disclosure will be described.

<Production of EVOH Pellets>

Conventionally known methods may be used for the production of pellets from the EVOH. There are two exemplary methods, which include:

a) a hot cutting method including the steps of extruding the EVOH in a melted state from an extrusion head of an extruder, cutting the extruded EVOH in a melted state, and cooling and solidifying the resulting pieces of the extruded EVOH into pellets; and b) a strand cutting method including the steps of extruding the EVOH in a melted state into a solidification bath, cooling and solidifying the extruded EVOH, and cutting the resulting EVOH strands.

The EVOH to be used as a material for the pellets in the hot cutting method (a) and the strand cutting method (b) described above is:

(α) a solution, a slurry or a hydrous composition of the EVOH prepared by saponifying a solution of the ethylene-vinyl ester copolymer in the production of the EVOH (hereinafter sometimes referred to as "EVOH solution/hydrous composition"); or (β) a melted-state EVOH prepared by melting the pellets of the EVOH (dry EVOH).

The EVOH hydrous composition means an EVOH composition prepared by properly adjusting the water content of the EVOH solution or slurry with the use of a solvent. The EVOH hydrous composition typically has an EVOH concentration of 20 to 60 wt. %.

Usable examples of the solvent include alcohols, and water/alcohol mixed solvents. Particularly, the water/alcohol mixed solvents are preferred. Examples of the alcohols include C1 to C10 aliphatic alcohols such as methanol, ethanol, propanol, n-butanol, and t-butanol. Particularly, methanol is preferred. The water/alcohol mixing weight ratio is preferably 80/20 to 5/95.

The EVOH hydrous composition typically contains 0 to 10 parts by weight of the alcohol and 10 to 500 parts by weight of water based on 100 parts by weight of the EVOH.

The method of adjusting the water content of the EVOH solution or slurry is not particularly limited. Exemplary methods for increasing the water content include: a method in which the solvent is sprayed over the EVOH solution or slurry; a method in which the EVOH solution or slurry is mixed with the solvent; and a method in which the EVOH solution or slurry is brought into contact with vapor of the solvent. The water content may be reduced by properly drying the EVOH solution or slurry, for example, by a hot air dryer of fluidized type or a hot air dryer of stationary type.

Next, the hot cutting method (a) and the strand cutting method (b) will be described.

a) Hot Cutting Method

Where the EVOH solution/hydrous composition is fed as the pellet material into the extruder, the temperature of the EVOH solution/hydrous composition in the extruder is preferably 70° C. to 170° C., more preferably 80° C. to 170° C., still more preferably 90° C. to 170° C. If the temperature of the EVOH solution/hydrous composition is excessively low, it will be difficult to completely melt the EVOH. If the temperature of the EVOH solution/hydrous composition is excessively high, the EVOH is susceptible to thermal degradation.

Where the dry EVOH is fed as the pellet material into the extruder, the temperature of the dry EVOH in the extruder is preferably 150° C. to 300° C., more preferably 160° C. to 280° C., still more preferably 170° C. to 250° C.

The temperature of the EVOH solution/hydrous composition and the temperature of the dry EVOH are each defined as a temperature detected around the extrusion head provided at the distal end of the extruder by means of a temperature sensor disposed in the cylinder of the extruder.

The EVOH solution/hydrous composition extruded from the die of the extruder, i.e., the melted-state EVOH, is cut before being cooled and solidified. Exemplary cutting methods include: an in-air hot cutting method in which the extruded EVOH is cut in air; and an in-water cutting method in which the EVOH is extruded in a container filled with cooling water (cooling liquid) and provided with a cutter, and cut in the cooling water.

In the in-water cutting method, the temperature of the cooling water is such that the EVOH extruded in the melted state is not instantly hardened (solidified). Where the EVOH solution/hydrous composition is used as the material, the temperature of the cooling water is preferably −20° C. to 50° C., more preferably −5° C. to 30° C.

Where the dry EVOH is used as the material, the EVOH is more easily solidified than in the case where the EVOH solution/hydrous composition is used as the material. Therefore, the temperature of the cooling water in the in-water cutting method is higher than in the case where the EVOH solution/hydrous composition is used as the material, and is typically 0° C. to 90° C., preferably 20° C. to 70° C.

The cooling liquid is not limited to water, but other usable examples of the cooling liquid include water/alcohol mixed solution, aromatic hydrocarbons such as benzene, ketones such as acetone and methyl ethyl ketone, ethers such as dipropyl ether, and organic esters such as methyl acetate, ethyl acetate, and methyl propionate. Of these, water or the water/alcohol mixed solution is used from the viewpoint of easy handling. The water/alcohol weight ratio of the water/alcohol mixed solution is typically 90/10 to 99/1. Usable examples of the alcohol include lower alcohols such as methanol, ethanol, and propanol. Of these, methanol is industrially preferred.

b) Strand Cutting Method

Where the EVOH solution/hydrous composition is fed as the pellet material into the extruder, the temperature of the EVOH to be extruded in the solidification bath is typically 10° C. to 100° C. The temperature of the solidification bath is such that the extruded EVOH can be cooled and solidified, and is typically −10° C. to 40° C. The retention time is typically about 10 to about 400 seconds.

Where the dry EVOH is fed as the pellet material into the extruder, the temperature of the EVOH to be extruded in the solidification bath is typically 150° C. to 300° C. The temperature of the solidification bath is typically 0° C. to 90° C., and the retention time is about 2 to about 400 seconds.

The same solution as described for the cooling liquid to be used in the hot cutting method (a) may be used as a solidification liquid for the solidification bath.

Thus, the EVOH pellets are prepared.

The EVOH pellets produced in the aforementioned manner are preferably porous EVOH pellets having a plurality of pores therein from the viewpoint of a boron compound incorporating process to be described later. The boron compound is infiltrated into the pores to be thereby easily retained in the pellets. Thus, the boron compound can be efficiently incorporated into the pellets. The size of the pores of the porous pellets is not particularly limited, as long as the boron compound can be infiltrated into the pores.

The porous pellets are typically prepared by using the EVOH hydrous composition as the pellet material, and properly controlling the EVOH concentration of the EVOH hydrous composition, the type of the solvent, the extrusion temperature, the solidification bath temperature, the retention time, and the like.

The water content of the porous pellets is preferably 20 to 80 wt. %. In the step of incorporating the boron compound to the EVOH pellets to be described later, the porous pellets having a water content within the aforementioned range ensure uniform and speedy incorporation of the boron compound.

The shape of the EVOH pellets generally depends upon the pellet production method, and may be any of various shapes. The EVOH pellets produced by the aforementioned methods and the EVOH composition pellets of the present disclosure may have any desired shape. The pellets may each have, for example, a spherical shape, an oval shape, a cylindrical shape, a cubic shape, a square prism shape, an irregular shape, or the like, and typically an oval shape or a cylindrical shape. The oval pellets typically each have a major diameter of 1 to 10 mm and a minor diameter of 1 to 6 mm, preferably a major diameter of 2 to 7 mm and a minor diameter of 2 to 5 mm, and the cylindrical pellets typically each have a bottom diameter of 1 to 10 mm and a length of 1 to 10 mm, preferably a bottom diameter of 2 to 7 mm and a length of 3 to 8 mm, for easier handling thereof in subsequent use as a forming material.

The EVOH pellets may be mixed with some other type of EVOH pellets for use in the present disclosure. Examples of the other type of EVOH pellets include EVOH pellets having a different ethylene structural unit content, a different saponification degree, a different melt flow rate (MFR), a different comonomer component, and/or a different content of the 1,2-diol structural unit represented by the above general formula (1).

The EVOH composition pellets of the present disclosure are produced by incorporating predetermined amounts of the boron compound and the fisheye-suppressing component to the EVOH pellets described above. The EVOH composition pellet production method is not particularly limited, but a typical production method will hereinafter be described.

<EVOH Composition Pellet Production Method>

The EVOH composition pellets of the present disclosure are produced by the steps of incorporating the boron compound to the EVOH pellets by bringing the EVOH pellets into contact with the boron compound, and rinsing the boron compound-incorporated EVOH pellets so that the pellet surface portions of the EVOH composition pellets have a boron compound content of not higher than 1.7 ppm on a boron basis based on the weight of the EVOH composition pellets, and at least one step (fisheye-suppressing component incorporating step) selected from the group consisting of the steps of:

(A') bringing the EVOH pellets into contact with the cinnamic acid component so that the EVOH composition pellets have a cinnamic acid component content of 0.0001 to 0.05 wt. % based on the weight of the EVOH composition pellets;

(B') bringing the EVOH pellets into contact with the alkali metal so that the EVOH composition pellets have an alkali metal content of not higher than 500 ppm based on the weight of the EVOH composition pellets;

(C') bringing the EVOH pellets into contact with the conjugated polyene so that the EVOH composition pellets have a conjugated polyene content of not higher than 0.06 wt. % based on the weight of the EVOH composition pellets;

(D') bringing the EVOH pellets into contact with the lubricant so that the EVOH composition pellets have a lubricant content of 0.001 to 0.15 wt. % based on the weight of the EVOH composition pellets; and (E') bringing the EVOH pellets into contact with the alkali earth metal so that the EVOH composition pellets have an alkali earth metal content of not higher than 100 ppm based on the weight of the EVOH composition pellets.

The respective steps will hereinafter be described.

<Step of Incorporating Boron Compound>

In the step of incorporating the boron compound to the EVOH pellets, the EVOH pellets are brought into contact with the boron compound.

Exemplary methods for bringing the EVOH pellets into contact with the boron compound include:

(1-1) a method in which the EVOH is brought into contact with the boron compound in the production of the EVOH pellets; and (1-2) a method in which the EVOH pellets preliminarily prepared are brought into contact with the boron compound.

Examples of the method (1-1) in which the EVOH is brought into contact with the boron compound in the production of the EVOH pellets include: a method in which the boron compound is added to the pellet material (the EVOH solution/hydrous composition or the dry EVOH); and a method in which a solution containing the boron compound is used as the solidification liquid in the production of the pellets.

Where the EVOH solution/hydrous composition is used as the pellet material, the boron compound may be added to the EVOH solution/hydrous composition. Where the dry EVOH pellets are melted and the melted-state EVOH is used as the material, the boron compound may be preliminarily incorporated to the dry EVOH.

Preferably, the EVOH hydrous composition to which the boron compound is added is extruded into strands in the solidification liquid, and the resulting strands are cut.

Examples of the method (1-2) in which the EVOH pellets preliminarily prepared are brought into contact with the boron compound include: a method in which a solution containing the boron compound is sprayed over the EVOH pellets; a method in which the EVOH pellets are immersed in a solution containing the boron compound; and a method in which the EVOH pellets are fed into a solution containing the boron compound with stirring. Of these, the method in which the EVOH pellets are fed into the solution containing the boron compound with stirring is preferred, because the boron compound can be efficiently incorporated into the insides of the pellets.

Exemplary solvents for the boron compound-containing solution include: water; lower alcohols such as methanol, ethanol, and propanol; and water/alcohol mixed solution. The water/alcohol mixed solution typically has a water/alcohol weight ratio of 90/10 to 10/90.

The boron compound-containing solution typically has a boron compound concentration of 0.001 to 1 wt. %, preferably 0.003 to 0.5 wt. %. If the concentration is excessively low, it will be difficult to incorporate the predetermined amount of the boron compound to the EVOH pellets. If the concentration is excessively high, a final product formed from the EVOH composition pellets tends to be poorer in appearance.

The boron compound content of the resulting EVOH pellets (the overall boron compound content of the resulting EVOH pellets) may be controlled by changing the boron compound concentration of the boron compound-containing solution, the period of the contact process, the temperature for the contact process, the stirring speed in the contact process, the water content of the EVOH pellets to be subjected to the contact process, and the like.

Of the aforementioned methods for bringing the EVOH pellets into contact with the boron compound, the method (1-2) in which the EVOH pellets preliminarily prepared are brought into contact with the boron compound is preferred, because this method is highly versatile and applicable to various types of pellets. The method in which the porous pellets are brought into contact with the boron compound-containing solution is more preferred.

The boron compound content (overall boron compound content) of the boron compound-incorporated EVOH pellets produced by the boron compound incorporating step (EVOH pellets with the boron compound content of pellet surface portions thereof being unadjusted (hereinafter referred to as "surface boron-unadjusted EVOH pellets")) is typically 10 to 10,000 ppm, preferably 20 to 5,000 ppm, more preferably 30 to 3,000 ppm, on a boron basis based on the weight of the pellets. If the boron compound content is excessively low, the effect of the incorporation of the boron compound tends to be reduced. If the boron compound content is excessively high, a final product formed from the EVOH composition pellets tends to be poorer in appearance.

The surface boron-unadjusted EVOH pellets produced by the aforementioned step may be used as they are in the subsequent step, but are generally dried. A known drying method may be employed for the drying. Examples of the known drying method include a fluidized drying method using a drum/groove type agitation dryer, a round pipe dryer, a rotary dryer, a fluid bed dryer, a vibrating fluid bed dryer or a conical rotor type dryer, and a stationary drying method using a batch box type dryer, a band dryer, a tunnel dryer or a vertical silo dryer. The surface boron-unadjusted EVOH pellets can be efficiently dried without any influence thereon by passing gas such as nitrogen gas at 80° C. to 150° C. through the dryer.

<Step of Rinsing EVOH Pellets>

Next, the step of rinsing the EVOH pellets will be described.

The surface boron-unadjusted EVOH pellets are subjected to a rinsing process, depending on the overall boron compound content of the pellets and the boron compound content of the pellet surface portions, whereby the boron compound content of the pellet surface portions is adjusted.

In the rinsing process, the surface boron-unadjusted EVOH pellets are brought into contact with a rinsing liquid. Exemplary contact methods include: a method in which the surface boron-unadjusted EVOH pellets are immersed in the rinsing liquid with stirring; a method in which the surface boron-unadjusted EVOH pellets are circulated in the rinsing liquid; and a method in which the rinsing liquid is sprayed over the surface boron-unadjusted EVOH pellets. In the immersing method described above, it is effective to apply vibrations such as ultrasonic vibrations to the rinsing liquid during the immersion. Of the aforementioned methods, the method in which the surface boron-unadjusted EVOH pellets are immersed in the rinsing liquid with stirring and the method in which the surface boron-unadjusted EVOH pellets are circulated in the rinsing liquid are industrially preferred.

The rinsing process is preferably performed by bringing the surface boron-unadjusted EVOH pellets into contact with the rinsing liquid. The rinsing liquid is preferably a water/alcohol mixed solution or an alcohol, more preferably the water/alcohol mixed solution.

Preferred examples of the alcohol include alcohols having a carbon number of 1 to 8, preferably 1 to 5, more preferably 1 to 3, such as methanol, ethanol, 1-propanol, 2-propanol, 1-butanol, 2-methyl-1-propanol, 2-butanol, and 2-methyl-2-propanol. Of these, methanol is particularly preferred for availability and inexpensiveness.

Where the water/alcohol mixed solution or the alcohol is used as the rinsing liquid, the water/alcohol weight ratio is 80/20 to 0/100, preferably 65/35 to 15/85, particularly preferably 50/50 to 20/80. If the water amount is excessively great or if the alcohol concentration is excessively high, the surface boron compound content adjusting effect tends to be reduced. Therefore, a water/alcohol mixed solution having a water/alcohol weight ratio falling within the aforementioned range is preferred.

In general, the boron compound has a higher solubility in the alcohol than in water. Therefore, the alcohol is generally used as the rinsing liquid for the adjustment of the boron content. However, it was unexpectedly found that the boron compound can be more effectively released from the surface boron-unadjusted EVOH pellets by using the water/alcohol mixed solution as the rinsing liquid than by using the alcohol alone in the present disclosure. It is noted that the boron compound has a solubility of about 0.1 to about 10 wt. % in 10 g of water at 23° C., and a solubility of about 15 to about 30 wt. % in 10 g of methanol at 23° C.

A contact period during which the surface boron-unadjusted EVOH pellets are kept in contact with the rinsing liquid is not particularly limited, as long as the boron content can be adjusted to the predetermined concentration level. The contact period is typically 5 minutes to 48 hours, preferably 10 minutes to 24 hours. The temperature of the rinsing liquid is typically 10° C. to 80° C., preferably 20° C. to 60° C.

The boron compound-incorporated EVOH pellets thus subjected to the rinsing process may be dried as required. More specifically, the boron compound-incorporated EVOH pellets are preferably dried to a water content of about 0.01 to about 1 wt. %, preferably about 0.05 to about 0.5 wt. %. The same drying methods as described for drying the surface boron-unadjusted EVOH pellets may be used for drying the boron compound-incorporated EVOH pellets.

The rinsing process reduces the boron compound content of the pellet surface portions. Thus, the boron compound-incorporated EVOH pellets with the boron compound content of their pellet surface portions reduced to not higher than 1.7 ppm on a boron basis according to a first feature of the present disclosure are produced.

Next, the step of incorporating a predetermined proportion of at least one component (fisheye-suppressing component) selected from the group consisting of the cinnamic acid component, the alkali metal, the conjugated polyene, the lubricant, and the alkali earth metal to the EVOH pellets according to a second feature of the present disclosure will be described.

<(A') Step of Incorporating Cinnamic Acid Component>

Cinnamic acid component-incorporated EVOH pellets may be produced by bringing the EVOH pellets into contact with the cinnamic acid component.

Exemplary methods for bringing the EVOH pellets into contact with the cinnamic acid component include:
(i) a method in which the EVOH is brought into contact with the cinnamic acid component in the production of the pellets; and
(ii) a method in which the EVOH pellets preliminarily prepared are brought into contact with the cinnamic acid component.

Examples of the method (i) in which the EVOH is brought into contact with the cinnamic acid component in the production of the pellets include: a method in which the cinnamic acid component is added to the pellet material (the EVOH solution/hydrous composition or the dry EVOH); and a method in which a solution containing the cinnamic acid component is used as the solidification liquid when the pellets are produced by the extrusion.

Where the EVOH solution/hydrous composition is used as the pellet material, the cinnamic acid component may be added to the EVOH solution/hydrous composition. Where the dry EVOH pellets are melted and the melted-state EVOH is used as the material, the cinnamic acid component may be preliminarily incorporated to the dry EVOH.

The method in which the cinnamic acid component is added to the EVOH solution/hydrous composition is preferred.

Examples of the method (ii) in which the EVOH pellets preliminarily prepared are brought into contact with the cinnamic acid component include: a method in which a solution containing the cinnamic acid component is sprayed over the EVOH pellets; a method in which the EVOH pellets are immersed in a solution containing the cinnamic acid component; a method in which the EVOH pellets are fed into a solution containing the cinnamic acid component with stirring; and a method in which powder of the cinnamic acid component is directly added to and mixed with the EVOH pellets. Of these, the method in which the powdery cinnamic acid component is directly added to and mixed with the EVOH pellets is preferred, because the cinnamic acid component can be efficiently incorporated to the EVOH pellets.

Where the cinnamic acid component-containing solution is sprayed over the EVOH pellets, the solution typically has a cinnamic acid component concentration of 0.01 to 20 wt. %, preferably 0.05 to 15 wt. %. Where the EVOH pellets are immersed in the cinnamic acid component-containing solution and where the EVOH pellets are fed into the cinnamic acid component-containing solution with stirring, the solution typically has a cinnamic acid component concentration of 0.0001 to 0.05 wt. %, preferably 0.001 to 0.04 wt. %. If the concentration is excessively low, it will be difficult to incorporate the predetermined amount of the cinnamic acid component to the EVOH pellets. If the concentration is excessively high, a final product formed from the EVOH composition pellets tends to be poorer in appearance. Where the cinnamic acid component-containing solution is used, the same solvents as described for the boron compound-containing solution may be used for the cinnamic acid component-containing solution.

In the contact methods using the cinnamic acid component-containing solution, the cinnamic acid component content may be controlled by the cinnamic acid component concentration of the solution, the period of the contact process, the temperature for the contact process, the stirring speed in the contact process, the water content of the EVOH pellets to be subjected to the contact process, and the like.

Where the powdery cinnamic acid component is directly added to the EVOH pellets, the amount of the added cinnamic acid component may be regarded as the cinnamic acid component content. The amount of the cinnamic acid component to be added is typically 0.0001 to 0.05 wt. %, preferably 0.001 to 0.04 wt. %, more preferably 0.005 to 0.035 wt. %, based on the weight of the EVOH pellets.

Of the aforementioned methods for the contact with the cinnamic acid component, the method (ii) in which the EVOH pellets preliminarily prepared are brought into contact with the cinnamic acid component is preferred, and the method in which the powdery cinnamic acid component is directly added to and mixed with the EVOH pellets is particularly preferred, because these methods are highly versatile and applicable to various types of pellets.

The cinnamic acid component-incorporated EVOH pellets produced by the aforementioned step may be dried as required. More specifically, the cinnamic acid component-incorporated EVOH pellets are preferably dried to a water content of about 0.01 to about 1 wt. %, particularly preferably about 0.05 to about 0.5 wt. %. The same drying methods as described for drying the surface boron-unadjusted EVOH pellets may be used for drying the cinnamic acid component-incorporated EVOH pellets.

Thus, the cinnamic acid component-incorporated EVOH pellets are produced by the aforementioned step.

<(B') Step of Incorporating Alkali Metal>

Alkali metal-incorporated EVOH pellets are produced by incorporating the alkali metal to the EVOH pellets.

Exemplary methods for incorporating the alkali metal to the EVOH pellets include:

(iii) a method in which the EVOH is brought into contact with the alkali metal in the production of the EVOH pellets;

(iv) a method in which the EVOH pellets preliminarily prepared are brought into contact with the alkali metal; and (v) a method in which an alkali metal salt generated in the saponification step of the EVOH production process is allowed to remain.

Examples of the method (iii) in which the EVOH is brought into contact with the alkali metal in the production of the EVOH pellets include: a method in which the alkali metal compound is added to the pellet material (the EVOH solution/hydrous composition or the dry EVOH); and a method in which a solution containing the alkali metal is used as the solidification liquid when the pellets are produced by the extrusion.

Where the EVOH solution/hydrous composition is used as the pellet material, the alkali metal compound may be dispersed in the EVOH solution/hydrous composition. Where the dry EVOH is used, pellets of the dry EVOH may be melted, and the melted-state EVOH and the alkali metal compound may be melt-kneaded in the extruder.

The method in which the alkali metal compound is dispersed in the EVOH solution/hydrous composition is preferred.

Examples of the method (iv) in which the EVOH pellets preliminarily prepared are brought into contact with the alkali metal include: a method in which a solution containing the alkali metal is sprayed over the EVOH pellets; a method in which the EVOH pellets are immersed in a solution containing the alkali metal; a method in which the EVOH pellets are fed into a solution containing the alkali metal with stirring; and a method in which powder of the alkali metal compound is directly added to and mixed with the EVOH pellets. Of these, the method in which the EVOH pellets are fed into the alkali metal-containing solution with stirring is preferred, because the alkali metal can be efficiently incorporated to the EVOH pellets.

The alkali metal-containing solution typically has an alkali metal concentration of 0.001 to 1 wt. %, preferably 0.01 to 0.1 wt. %. If the concentration is excessively low, it will be difficult to incorporate the predetermined amount of the alkali metal to the EVOH pellets. If the concentration is excessively high, a final product formed from the EVOH composition pellets tends to be poorer in appearance. The same solvents as described for the boron compound-containing solution may be used for the alkali metal-containing solution.

In the contact methods using the alkali metal-containing solution, the alkali metal content may be controlled by the alkali metal concentration of the solution, the period of the contact process, the temperature for the contact process, the stirring speed in the contact process, the water content of the EVOH pellets to be subjected to the contact process, and the like.

Where the powdery alkali metal compound is directly added to the EVOH pellets, the alkali metal amount of the added alkali metal compound may be regarded as the alkali metal content. The amount of the alkali metal compound to be added is typically not greater than 500 ppm, preferably not greater than 400 ppm, more preferably not greater than 300 ppm, on an alkali metal basis based on the weight of the EVOH pellets. The lower limit of the alkali metal amount is 10 ppm. If the alkali metal amount is excessively small, the fisheye-suppressing effect provided by reducing the viscosity of the EVOH tends to be reduced. If the alkali metal amount is excessively great, the alkali metal compound present in the EVOH is liable to be insufficiently dispersed in the EVOH to agglomerate, thereby increasing the fisheyes. Further, the decomposition of the EVOH tends to excessively proceed, resulting in coloration of the EVOH and odor emanation from the EVOH.

The method (v) in which the alkali metal salt generated in the saponification step of the EVOH production process is allowed to remain will be described. In general, the EVOH is produced by using an alkali metal hydroxide such as sodium hydroxide or potassium hydroxide as a saponification catalyst. Therefore, an alkali metal contained in the saponification catalyst is inevitably present in the EVOH as an alkali metal acetate by-produced during the saponification or as an alkali metal salt produced with a carboxyl group generated in a trace amount at a polymer chain terminal of the EVOH. The amount of the alkali metal present in the EVOH is typically about 3,000 ppm based on the weight of the EVOH in an unrinsed state.

Where the alkali metal remains in an amount greater than the predetermined amount in the EVOH pellets, the alkali metal content is adjusted to the specific trace level specified in the present disclosure by rinsing the EVOH to a greater extent than usual. More specifically, it is difficult to remove the alkali metal to the specific trace concentration simply by rinsing the EVOH pellets with water. Where the EVOH produced by the saponification is used, therefore, the EVOH pellets are preferably rinsed with an acid rinsing liquid such as acetic acid and then rinsed with water for use. Particularly, the alkali metal bonded to the carboxyl group at the polymer chain terminal of the EVOH can be efficiently removed by the rinsing with the acid rinsing liquid.

Exemplary acids to be used for the acid rinsing liquid include water-soluble weak acids such as acetic acid, propionic acid, and butyric acid. Of these, acetic acid is preferably used. Preferred examples of water to be used as the rinsing liquid include water free from metal ion impurities, such as ion exchanged water, distilled water, and filtered water.

Of the methods for incorporating the alkali metal to the EVOH pellets, the method (iv) in which the EVOH pellets preliminarily prepared are brought into contact with the alkali metal is preferred, and the method in which the EVOH pellets are fed into the alkali metal-containing solution with stirring is particularly preferred, because these methods are highly versatile and applicable to various types of pellets.

The EVOH pellets from which the alkali metal generated in the saponification step is partly removed according to the method (v) are preferably used as the EVOH pellets, because the alkali metal content can be easily adjusted.

The alkali metal-incorporated EVOH pellets may be dried as required. More specifically, the alkali metal-incorporated EVOH pellets are preferably dried to a water content of about 0.01 to about 1 wt. %, particularly preferably about 0.05 to about 0.5 wt. %. The same drying methods as described for drying the surface boron-unadjusted EVOH pellets may be used for drying the alkali metal-incorporated EVOH pellets.

Thus, the alkali metal-incorporated EVOH pellets are produced by the aforementioned step.

<(C') Step of Incorporating Conjugated Polyene>

Conjugated polyene-incorporated EVOH pellets are produced by incorporating the conjugated polyene to the EVOH pellets.

Exemplary methods for incorporating the conjugated polyene to the EVOH pellets include:

(vi) a method in which the EVOH is brought into contact with the conjugated polyene in the production of the EVOH pellets; and (vii) a method in which the EVOH pellets preliminarily prepared are brought into contact with the conjugated polyene.

Examples of the method (vi) in which the EVOH is brought into contact with the conjugated polyene in the production of the EVOH pellets include: a method in which the conjugated polyene is added to a solution or a slurry of an ethylene-vinyl ester copolymer prepared by copolymerizing ethylene and the vinyl ester monomer; a method in which the conjugated polyene is added to the pellet material (the EVOH hydrous composition or the dry EVOH); and a method in which a solution containing the conjugated polyene is used as the solidification liquid in which the EVOH is extruded into a strand form in the production of the EVOH pellets.

Where the conjugated polyene is added to the solution or the slurry of the ethylene-vinyl ester copolymer prepared by copolymerizing ethylene and the vinyl ester monomer, the amount of the conjugated polyene to be added is preferably 0.02 to 0.1 part by weight based on 100 parts by weight of the ethylene-vinyl ester copolymer. The conjugated polyene may be added in a powdery form or in a solution form. The solution is preferably an alcohol solution, and particularly preferably a methanol solution because of its excellent dispersibility in the EVOH solution or slurry. The solution preferably has a conjugated polyene concentration of 1 to 20 wt. %, more preferably 3 to 10 wt. %. If the conjugated polyene concentration of the solution is less than 1 wt. %, the resin content of the ethylene-vinyl ester copolymer solution or slurry is liable to be reduced by the addition of the solution. If the conjugated polyene concentration of the solution is higher than 20 wt. %, the dispersibility of the conjugated polyene in the resulting paste tends to be reduced.

Where the EVOH hydrous composition is used as the pellet material in the method in which the conjugated polyene is added to the pellet material, the conjugated polyene may be dispersed in the EVOH hydrous composition. Where the dry EVOH is used as the pellet material, pellets of the dry EVOH are melted, and the melted-state EVOH and the conjugated polyene may be melt-kneaded in the extruder.

The amount of the conjugated polyene to be added to the pellet material (the EVOH hydrous composition or the dry EVOH) is typically not greater than 0.06 wt. %, preferably not greater than 0.05 wt. %, more preferably not greater than 0.04 wt. %, based on the weight of the overall EVOH pellets. The lower limit of the conjugated polyene amount is 0.001 wt. %. If the conjugated polyene amount is excessively small, it will be impossible to provide the fisheye-suppressing effect by capturing the radicals. If the conjugated polyene amount is excessively great, the amount of the conjugated polyene bleeding to the pellet surface portions will be increased, resulting in instability of the pH balance in the pellet surface portions. This will increase the fisheyes in a film formed from the EVOH composition pellets.

Where the conjugated polyene-containing solution is used as the solidification liquid, the conjugated polyene concentration of the solidification liquid is typically 0.0001 to 0.5 wt. %, preferably 0.001 to 0.1 wt. %. If the concentration is excessively low, it will be difficult to incorporate the predetermined amount of the conjugated polyene to the EVOH pellets. If the concentration is excessively high, a final product formed from the EVOH composition pellets tends to be poorer in appearance.

Examples of the method (vii) in which the EVOH pellets preliminarily prepared are brought into contact with the conjugated polyene include: a method in which a solution containing the conjugated polyene is sprayed over the EVOH pellets; a method in which the EVOH pellets are immersed in a solution containing the conjugated polyene; a method in which the EVOH pellets are fed into a solution containing the conjugated polyene with stirring; and a method in which powder of the conjugated polyene is directly added to and mixed with the EVOH pellets.

Of these, the method in which the EVOH pellets are fed into the conjugated polyene-containing solution with stirring is preferred.

Of the aforementioned methods, the method (vi) in which the EVOH is brought into contact with the conjugated polyene in the production of the EVOH pellets is preferred, and the method in which the conjugated polyene is added to the ethylene-vinyl ester copolymer solution or slurry is particularly preferred, because these methods are highly versatile and applicable to various types of pellets.

Any of the conjugated polyene adding methods may be used in combination for adding the conjugated polyene to the EVOH.

In the contact methods using the conjugated polyene-containing solution, the conjugated polyene content of the EVOH pellets may be controlled by the conjugated polyene concentration of the solution, the period of the contact process, the temperature for the contact process, the stirring speed in the contact process, the water content of the EVOH pellets to be subjected to the contact process, and the like.

The conjugated polyene-incorporated EVOH pellets may be dried as required. More specifically, the conjugated polyene-incorporated EVOH pellets are dried to a water content of about 0.01 to about 1 wt. %, preferably about 0.05 to about 0.5 wt. %. The same drying methods as described for drying the surface boron-unadjusted EVOH pellets may be used for drying the conjugated polyene-incorporated EVOH pellets.

Thus, the conjugated polyene-incorporated EVOH pellets are produced by the aforementioned step.

<(D') Step of Incorporating Lubricant>

Lubricant-incorporated EVOH pellets are produced by incorporating the lubricant to the EVOH pellets.

Exemplary methods for incorporating the lubricant to the EVOH pellets include:

(viii) a method in which the EVOH is brought into contact with the lubricant in the production of the EVOH pellets; and (ix) a method in which the EVOH pellets preliminarily prepared are brought into contact with the lubricant.

Examples of the method (viii) in which the EVOH is brought into contact with the lubricant in the production of the EVOH pellets include: a method in which the lubricant is added to the pellet material (the EVOH solution/hydrous composition or the dry EVOH), and a method in which a solution containing the lubricant is used as the solidification liquid.

Where the EVOH solution/hydrous composition is used as the pellet material, for example, the lubricant may be dispersed in the EVOH solution/hydrous composition. Where the dry EVOH is used, pellets of the dry EVOH may be melted and the melted-state EVOH and the lubricant may be melt-kneaded in the extruder.

Examples of the method (ix) in which the EVOH pellets preliminarily prepared are brought into contact with the lubricant include: a method in which a solution or a dispersion containing the lubricant is sprayed over the EVOH pellets; a method in which the EVOH pellets are immersed in a solution or a dispersion containing the lubricant; a method in which the EVOH pellets are fed into a solution or a dispersion containing the lubricant with stirring; and a method in which powder of the lubricant is directly added to and mixed with the EVOH pellets. Of these, the method in which the powdery lubricant is directly added to and mixed with the EVOH pellets is preferred, because the lubricant can be efficiently incorporated to the EVOH pellets.

The lubricant-containing solution or dispersion typically has a lubricant concentration of 1 to 80 wt. %, preferably 20 to 70 wt. %. If the concentration is excessively low, it will be difficult to incorporate the predetermined amount of the lubricant to the EVOH pellets. If the concentration is excessively high, a final product formed from the EVOH composition pellets tends to be poorer in appearance. Where the lubricant-containing solution or dispersion is used, the same solvents as described for the boron compound-containing solution may be used for the lubricant-containing solution or dispersion.

In the methods using the lubricant-containing solution or dispersion, the lubricant content of the EVOH pellets may be controlled by changing the lubricant concentration and the amount of the lubricant-containing solution or dispersion to be added, the period of the contact process, the temperature for the contact process, the stirring speed in the contact process, the water content of the EVOH pellets to be subjected to the contact process, and the like.

Of the aforementioned methods for bringing the EVOH into contact with the lubricant, the method (ix) in which the EVOH pellets preliminarily prepared are brought into contact with the lubricant is preferred, and the method in which the powdery lubricant is directly added to and mixed with the EVOH pellets is particularly preferred, because these methods are highly versatile and applicable to various types of pellets.

Where the powdery lubricant is directly added to the EVOH pellets, the amount of the added lubricant may be regarded as the lubricant content. The amount of the lubricant to be added is typically 0.001 to 0.15 wt. %, preferably 0.003 to 0.12 wt. %, more preferably 0.005 to 0.10 wt. %, based on the weight of the EVOH pellets. If the lubricant amount is excessively small, the friction between the screw surfaces of the extruder and the EVOH pellets will be increased, making it impossible to stably feed the pellets. This will increase the fisheyes. If the lubricant amount is excessively great, the lubricant will be insufficiently dispersed to agglomerate. This will conversely increase the fisheyes. Further, the friction between the EVOH pellets and the screw surfaces will be reduced, making it impossible to stably feed the pellets. This will increase the fisheyes.

The lubricant-incorporated EVOH pellets may be dried as required. More specifically, the lubricant-incorporated EVOH pellets are dried to a water content of about 0.01 to about 1 wt. %, preferably about 0.05 to about 0.5 wt. %. The same drying methods as described for drying the surface boron-unadjusted EVOH pellets may be used for drying the lubricant-incorporated EVOH pellets.

Thus, the lubricant-incorporated EVOH pellets are produced by the aforementioned step.

<(E') Step of Incorporating Alkali Earth Metal>

Alkali earth metal-incorporated EVOH pellets are produced by incorporating the alkali earth metal to the EVOH pellets.

Exemplary methods for incorporating the alkali earth metal to the EVOH pellets include:

(x) a method in which the EVOH is brought into contact with the alkali earth metal in the production of the EVOH pellets; and (xi) a method in which the EVOH pellets preliminarily prepared are brought into contact with the alkali earth metal.

Examples of the method (x) in which the EVOH is brought into contact with the alkali earth metal in the production of the EVOH pellets include: a method in which an alkali earth metal compound is added to the pellet material (the EVOH solution/hydrous composition or the dry EVOH); and a method in which a solution containing the alkali earth metal is used as the solidification liquid when the pellets are produced by the extrusion.

Where the EVOH solution/hydrous composition is used as the pellet material in the method in which the alkali earth metal compound is added to the pellet material, the alkali earth metal compound may be dispersed in the EVOH solution/hydrous composition. Where the dry EVOH is used as the pellet material, pellets of the dry EVOH may be melted, and the melted-state EVOH and the alkali earth metal compound may be melt-kneaded in the extruder.

The method in which the alkali earth metal compound is dispersed in the EVOH solution/hydrous composition is particularly preferred.

Examples of the method (xi) in which the EVOH pellets preliminarily prepared are brought into contact with the alkali earth metal include: a method in which a solution containing the alkali earth metal is sprayed over the EVOH pellets; a method in which the EVOH pellets are immersed in a solution containing the alkali earth metal; a method in which the EVOH pellets are fed into a solution containing the alkali earth metal with stirring; and a method in which powder of the alkali earth metal compound is directly added to and mixed with the EVOH pellets. Of these, the method in which the powdery alkali earth metal compound is directly added to and mixed with the EVOH pellets is preferred, because the alkali earth metal can be efficiently incorporated to the EVOH pellets.

The alkali earth metal-containing solution typically has an alkali earth metal concentration of 0.01 to 20 wt. %, preferably 0.05 to 15 wt. %. If the concentration is excessively low, it will be difficult to incorporate the predetermined amount of the alkali earth metal to the EVOH pellets. If the concentration is excessively high, a final product formed from the EVOH composition pellets tends to be poorer in appearance. Where the alkali earth metal-containing solution is used, the same solvents as described for the boron compound-containing solution may be used for the alkali earth metal-containing solution.

In the methods using the alkali earth metal-containing solution, the alkali earth metal content of the EVOH pellets may be controlled by changing the alkali earth metal concentration and the amount of the alkali earth metal-containing solution to be added, the period of the contact process, the temperature for the contact process, the stirring speed in the contact process, the water content of the EVOH pellets to be subjected to the contact process, and the like.

Where the powdery alkali earth metal compound is directly added to the EVOH pellets, the alkali earth metal amount of the added alkali earth metal compound may be regarded as the alkali earth metal content. The amount of the alkali earth metal to be added is typically not greater than 100 ppm, preferably not greater than 80 ppm, more preferably not greater than 50 ppm, based on the weight of the EVOH pellets. The lower limit of the alkali earth metal amount is 1 ppm. If the alkali earth metal amount is excessively small, it will be impossible to provide the fisheye-suppressing effect by reducing the viscosity of the EVOH. If the alkali earth metal amount is excessively great, the alkali earth metal compound present in the EVOH is liable to be insufficiently dispersed in the EVOH to agglomerate, resulting in a greater number of fisheyes, the coloration of the EVOH, and the odor emanation from the EVOH.

Of the methods for bringing the EVOH pellets into contact with the alkali earth metal, the method (xi) in which the EVOH pellets preliminarily prepared are brought into contact with the alkali earth metal is preferred, and the method in which the powdery alkali earth metal compound is directly added to and mixed with the EVOH pellets is particularly preferred, because these methods are highly versatile and applicable to various types of pellets.

The alkali earth metal-incorporated EVOH pellets may be dried as required. More specifically, the alkali earth metal-incorporated EVOH pellets are preferably dried to a water content of about 0.01 to about 1 wt. %, particularly preferably about 0.05 to about 0.5 wt. %. The same drying methods as described for drying the surface boron-unadjusted EVOH pellets may be used for drying the alkali earth metal-incorporated EVOH pellets.

Thus, the alkali earth metal-incorporated EVOH pellets are produced by the aforementioned step.

The EVOH composition pellets of the present disclosure are produced by the steps of: bringing the boron compound into contact with the EVOH pellets to incorporate the boron compound to the EVOH pellets; rinsing the EVOH pellets; and incorporating the fisheye-suppressing component to the EVOH pellets.

Particularly, where the cinnamic acid component is used as the fisheye-suppressing component, it is preferred, from the viewpoint of the working efficiency, to perform the step of bringing the EVOH pellets into contact with the boron compound to incorporate the boron compound to the EVOH pellets, then the step of rinsing the EVOH pellets, and finally the step of incorporating the fisheye-suppressing component (cinnamic acid component) to the EVOH pellets.

Further, where the conjugated polyene is used as the fisheye-suppressing component, it is preferred, from the viewpoint of the working efficiency, to perform the step of incorporating the fisheye-suppressing component (conjugated polyene) to the EVOH pellets, then the step of bringing the EVOH pellets into contact with the boron compound to incorporate the boron compound to the EVOH pellets, and finally the step of rinsing the EVOH pellets.

Further, where the alkali metal is used as the fisheye-suppressing component, it is preferred, from the viewpoint of the working efficiency, to simultaneously perform the step of bringing the EVOH pellets into contact with the boron compound to incorporate the boron compound to the EVOH pellets, and the step of incorporating the fisheye-suppressing component (alkali metal) to the EVOH pellets, and then perform the step of rinsing the EVOH pellets. In order to simultaneously perform the step of bringing the EVOH pellets into contact with the boron compound to incorporate the boron compound to the EVOH pellets, and the step of incorporating the alkali metal to the EVOH pellets, the EVOH pellets may be brought into contact with a solution containing the boron compound and the alkali metal.

Where the lubricant is used as the fisheye-suppressing component, it is preferred, from the viewpoint of the working efficiency, to perform the step of bringing the EVOH pellets into contact with the boron compound to incorporate the boron compound to the EVOH pellets, then the step of rinsing the EVOH pellets, and finally the step of incorporating the fisheye-suppressing component (lubricant) to the EVOH pellets.

Where the alkali earth metal is used as the fisheye-suppressing component, it is preferred, from the viewpoint of the working efficiency, to perform the step of bringing the EVOH pellets into contact with the boron compound to incorporate the boron compound to the EVOH pellets, then the step of rinsing the EVOH pellets, and finally the step of incorporating the fisheye-suppressing component (alkali earth metal) to the EVOH pellets.

In the method for producing the EVOH composition pellets of the present disclosure, another step may be performed between the aforementioned steps, or the EVOH pellets subjected to the final step described above may be subjected to further another step.

<EVOH Composition Pellets>

The EVOH composition pellets of the present disclosure typically have a water content of 0.01 to 1 wt. %, preferably 0.05 to 0.5 wt. %. If the water content is excessively low, it will be impossible to plasticize the EVOH by water molecules, so that the EVOH composition pellets cannot be easily melted during the extrusion. This tends to result in fisheye defects due to unmelted parts of the pellets. If the water content is excessively high, a foaming phenomenon is liable to occur during the extrusion, so that a product formed from the EVOH composition pellets tends to be poorer in appearance.

[Other Ingredients]

The EVOH composition pellets of the present disclosure may contain a resin composition prepared by mixing a resin, other than the EVOH, generally used for the EVOH composition in an amount (e.g., not greater than 20 wt. %, preferably not greater than 10 wt. %) that does not impair the effects of the present disclosure.

The EVOH composition pellets of the present disclosure may contain additives that are generally added to the EVOH, as long as the effects of the present disclosure are not impaired. Examples of the additives include heat stabilizer, antioxidant, antistatic agent, colorant, UV absorber, plasticizer, light stabilizer, surfactant, antibacterial agent, drying agent, anti-blocking agent, flame retardant, crosslinking agent, curing agent, foaming agent, nucleating agent, anti-fogging agent, biodegradation agent, silane coupling agent, and oxygen absorbing agent, which may be used alone or in combination.

Examples of the heat stabilizer to be added for improving heat stability in the melt forming and other physical properties include: organic acids such as acetic acid, propionic acid, butyric acid, lauric acid, stearic acid, oleic acid, and behenic acid, and salts such as alkali metal salts (sodium salts, potassium salts, and the like), alkali earth metal salts (calcium salts, magnesium salts, and the like), and zinc salts of these organic acids; and inorganic acids such as sulfuric acid, sulfurous acid, carbonic acid, and phosphoric acid, and salts such as alkali metal salts (sodium salts, potassium salts, and the like), alkali earth metal salts (calcium salts, magnesium salts, and the like), and zinc salts of these inorganic acids. Of these, acetic acid, acetic acid salts, and phosphoric acid salts are particularly preferred. These may be used alone or in combination. Where an alkali metal salt or an alkali earth metal salt is blended as the heat stabilizer, the alkali metal content of the alkali metal salt or the alkali earth metal content of the alkali earth metal salt is counted in the alkali metal content or the alkali earth metal content of the EVOH composition pellets of the present disclosure.

Where any of these additives is added to the EVOH pellets, the adding step may be performed before the contact process for bringing the EVOH pellets into contact with the boron compound or the fisheye-suppressing component, simultaneously with the contact process, or after the contact process. Preferably, the adding step is performed simultaneously with the contact process, because the adding step is less liable to influence the boron compound and the fisheye-suppressing component.

The method of adding the additives to the EVOH pellets is not particularly limited, but the addition of the additives may be achieved typically by bringing the EVOH pellets into contact with a solution containing the additives. For the addition of the additives, the EVOH pellets may be immersed in the solution containing the additives before the contact of the EVOH pellets with the boron compound or the fisheye-suppressing component, or the additives may be contained in a solution containing the boron compound and at least one of the fisheye-suppressing components.

Even if the product melt-formed from the EVOH composition pellets of the present disclosure is a single layer film, the single layer film is excellent in formability and appearance but, as required, a layer of some other resin may be provided on the single layer film to form a multilayer structure from the viewpoint of water resistance, strength, and the like.

Examples of the formed product for practical applications include a single layer film formed by using the EVOH composition pellets of the present disclosure, and a multilayer structure including at least one layer formed by using the EVOH composition pellets of the present disclosure.

The multilayer structure will hereinafter be described.

For production of the multilayer structure, the layer formed by using the EVOH composition pellets of the present disclosure is laminated with some other base material (a thermoplastic resin or the like) on one or both sides thereof. Exemplary laminating methods include: a laminating method in which the other base material is melt-extruded onto a film or a sheet formed by using the EVOH composition pellets of the present disclosure; a laminating method in which the EVOH composition pellets of the present disclosure or the like are melt-extruded onto the other base material; a method in which the EVOH composition pellets of the present disclosure and the other base material are coextruded; and a method in which a film or a sheet (layer) formed by using the EVOH composition pellets of the present disclosure and the other base material (layer) are dry-laminated together with the use of a known adhesive agent such as of organic titanium compound, isocyanate compound, polyester compound or polyurethane compound. The melt forming temperature for the melt extrusion is generally selected from a range of 150° C. to 300° C.

The thermoplastic resin is useful as the other base material. Specific examples of the thermoplastic resin include: olefin homopolymers and copolymers including polyethylenes such as linear low-density polyethylenes, low-density polyethylenes, very-low-density polyethylenes, medium-density polyethylenes, and high-density polyethylenes, ethylene-vinyl acetate copolymers, ionomers, ethylene-propylene (block or random) copolymers, ethylene-acrylic acid copolymers, ethylene-acrylate copolymers, polypropylenes, propylene-α-olefin (C4 to C20 α-olefin) copolymers, polybutenes, and polypentenes, and polyolefin resins in a broader sense such as obtained by graft-modifying any of these olefin homopolymers and copolymers with an unsaturated carboxylic acid or an unsaturated carboxylic acid ester; and polyester resins, polyamide resins (including polyamide copolymers), polyvinyl chlorides, polyvinylidene chlorides, acryl resins, polystyrene resins, vinyl ester resins, polyester elastomers, polyurethane elastomers, chlorinated polyethylenes, chlorinated polypropylenes, aromatic and aliphatic polyketones, polyalcohols obtained by reduction of these polymers, and EVOHs other than the EVOH to be used in the present disclosure. From the viewpoint of the practicality and the physical properties (particularly, the strength) of the multilayer structure, the polypropylenes, the ethylene-propylene (block or random) copolymers, the polyamide resins, the polyethylene resins, the ethylene-vinyl acetate copolymers, the polystyrene resins, polyethylene terephthalates (PET), and polyethylene naphthalates (PEN) are preferably used.

Where a product, such as a film or a sheet, formed by using the EVOH composition pellets of the present disclosure is extrusion-coated with the other base material, or where the film or the sheet formed by using the EVOH composition pellets of the present disclosure and a film, a sheet or the like of the other base material are laminated together with the use of the adhesive agent, usable examples of the base material other than the thermoplastic resins described above include paper, metal foil, uniaxially or biaxially stretched plastic film or sheet, film or sheet on which an inorganic compound is vapor-deposited, woven fabric, nonwoven fabric, metal fiber material and wood material.

Where layers a (a1, a2, . . . ) formed by using the EVOH composition pellets of the present disclosure and layers b (b1, b2, . . . ) of the other base material (e.g., the thermoplastic resin) are laminated together to produce a multilayer structure having an innermost layer a, the layered configuration of the multilayer structure is not limited to a double layer structure a/b (which means an inner layer/outer layer structure, and this definition also applies to the following description), but may be any combination of these layers, e.g., a/b/a, a1/a2/b, a/b1/b2, a1/b1/a2/b2, a1/b1/b2/a2/b2/b1, or the like. Where the multilayer structure further includes a regrind layer R formed of a mixture containing at least the EVOH composition of the EVOH composition pellets of the present disclosure and the thermoplastic resin, the layered configuration of the multilayer structure may be, for example, a/R/b, a/R/a/b, a/b/R/a/R/b, a/b/a/R/a/b, a/b/R/a/R/a/R/b, or the like.

In the aforementioned layered configuration, as required, an adhesive resin layer may be provided between the layers. Various adhesive resins are usable as an adhesive resin for the adhesive resin layer. Examples of the adhesive resin for providing a highly stretchable multilayer structure include olefin polymers modified as containing a carboxyl group by chemically bonding an unsaturated carboxylic acid or its anhydride to the olefin polymers (the aforementioned polyolefin resins in a broader sense) by an addition reaction, a graft reaction or the like.

Specific preferred examples of the modified olefin polymers containing the hydroxyl group include polyethylenes graft-modified with maleic anhydride, polypropylenes graft-modified with maleic anhydride, ethylene-propylene (block or random) copolymers graft-modified with maleic anhydride, ethylene-ethyl acrylate copolymers graft-modified with maleic anhydride, and ethylene-vinyl acetate copolymers graft-modified with maleic anhydride, which may be used alone or in combination as a mixture. In this case, the proportion of the unsaturated carboxylic acid or its anhydride to be contained in the modified olefin polymers is preferably 0.001 to 3 wt. %, more preferably 0.01 to 1 wt. %, particularly preferably 0.03 to 0.5 wt. %. If the modification degree of such a modification product is excessively low, the adhesiveness tends to be poorer. If the modification degree is excessively high, on the other hand, a crosslinking reaction tends to occur, thereby reducing the formability.

Further, the adhesive resin may be blended with the EVOH of the EVOH composition pellets of the present disclosure, the other EVOH, a rubber/elastomer component such as polyisobutylene or ethylene propylene rubber, or the resin for the layer b. Particularly, the adhesiveness can be advantageously improved by blending a polyolefin resin different from the base polyolefin resin for the adhesive resin.

The thicknesses of the respective layers of the multilayer structure cannot be unconditionally specified, but depend on the layered configuration, the type of the layer b, the use purpose, the shape of the formed product, and the required physical properties. The thickness of the layer a is typically selected from a range of 5 to 500 µm, preferably 10 to 200 µm, and the thickness of the layer b is typically selected from a range of 10 to 5,000 µm, preferably 30 to 1,000 µm. The thickness of the adhesive resin layer is typically selected from a range of 5 to 400 µm, preferably about 10 to about 150 µm.

The multilayer structure may be used as it is in various forms. It is preferred to perform a heat stretching process on the multilayer structure for improvement of the physical properties of the multilayer structure. The term "heat stretching process" herein means a process in which a thermally uniformly heated laminate in the form of a film, a sheet or a parison is uniformly formed into a cup, a tray, a tube or a film with the use of a chuck, a plug, a vacuum force, a compressed air force, blowing means, or other forming means. The stretching process may be a uniaxial stretching process or a biaxial stretching process. The stretching ratio of the laminate is preferably as high as possible for physical properties. This makes it possible to produce stretched formed products excellent in gas barrier property without pinholes, cracking, uneven stretching, uneven thickness, delamination (interlayer separation), and the like which may otherwise occur during the stretching.

Other exemplary methods for stretching the multilayer structure include roll stretching method, tenter stretching method, tubular stretching method, stretch-blowing method and vacuum pressure forming method each having a higher stretching ratio. A simultaneous biaxial stretching method or a sequential biaxial stretching method may be employed for the biaxial stretching process. The stretching temperature is selected from a range of 60° C. to 170° C., preferably about 80° C. to about 160° C. It is also preferred to perform a heat-setting process after the completion of the stretching process. The heat-setting process may be performed by known means. The heat-setting may be achieved by heat-treating the stretched film at 80° C. to 170° C., preferably 100° C. to 160° C., for about 2 to about 600 seconds while keeping the stretched film in tension.

Where the multilayer structure is used for heat-shrink packaging applications for raw meat, processed meat, cheese or the like, the multilayer structure not subjected to the heat-setting process after the stretching is used as a product film, and the raw meat, the processed meat, the cheese or the like is wrapped with the film, which is in turn heat-treated at 50° C. to 130° C., preferably 70° C. to 120° C., for about 2 to about 300 seconds to be thereby heat-shrunk for tight packaging.

The multilayer structure thus produced may be used in any desired form. Exemplary forms include film, sheet, tape, and profile extrusion product. As required, the multilayer structure may be subjected to heat treatment, cooling process, rolling process, printing process, dry laminating process, solution or melt coating process, bag making process, deep drawing process, box making process, tube making process, splitting process, or the like.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, and pharmaceutical products.

EXAMPLES

Embodiments of the present disclosure will hereinafter be described more specifically by way of examples thereof. However, it should be understood that the embodiments of the present disclosure be not limited to these examples within the scope of the present disclosure.

In the following examples, "parts" and "%" are based on weight.

First, a measurement/evaluation method for pellets to be used in Examples and Comparative Examples will be described.

[Measurement/Evaluation Method]

(1) Overall Boron Compound Content of Pellets (on Boron Basis)

First, 0.1 g of EVOH pellets were treated together with concentrated nitric acid by a microwave decomposition method, and the resulting solution was diluted with purified water to a predetermined volume (0.75 mg/mL) to prepare a sample solution. The boron content was determined by analyzing the sample solution by means of an inductively coupled plasma emission spectrometer (ICP-AES) (720-ES Model available from Agilent Technologies, Inc.) The boron content thus determined corresponds to a boron amount attributable to the boron compound. This measurement/evaluation method was applied to the surface boron-unadjusted EVOH pellets and the EVOH composition pellets.

(2) Boron Compound Content of Pellet Surface Portions (on Boron Basis)

First, 4 g of the EVOH composition pellets were immersed still in 20 mL of methanol (at 30° C.) for 6 hours, and the resulting methanol solution was used as a measurement sample. The boron content was measured by analyzing the measurement sample by means of an inductively coupled plasma mass spectrometer (ICP-MS) (ELAN DRCII available from Perkin Elmer Corporation). The boron content of the pellet surface portions was determined by dividing the measured boron content by the weight (4 g) of the EVOH composition pellets. The boron content thus determined corresponds to the boron amount attributable to the boron compound.

(3) Cinnamic Acid Component Content of Pellets

Where the cinnamic acid component was added directly to the surfaces of the EVOH pellets, the amount of the added cinnamic acid component was regarded as the cinnamic acid component content of the EVOH composition pellets. Where the cinnamic acid component was present within the EVOH composition pellets, the cinnamic acid component content of the EVOH composition pellets was measured through the following procedure by liquid chromatography mass spectrometry (LC/MS/MS) for evaluation. In the following procedure, cinnamic acid was used as the cinnamic acid component by way of example. Where a cinnamic acid component other than cinnamic acid (e.g., a cinnamic acid salt) was used, the measurement was performed by the same procedure.

[Preparation of Standard Solutions]

Cinnamic acid (10.89 mg) was weighed in a 10-mL measuring flask, and dissolved in methanol to provide a 10-mL solution (standard stock solution having a concentration of 1,089 μg/mL). Then, the standard stock solution thus prepared was diluted with methanol to provide mixed standard solutions respectively having concentrations of 0.109 lag/mL, 0.218 μg/mL, 0.545 μg/mL, 1.09 μg/mL, and 2.18 μg/mL. A calibration line was prepared by performing the LC/MS/MS analysis on these mixed standard solutions.

[Preparation of Sample Solution]

After the EVOH composition pellets (1 g) were weighed in a 10-mL measuring flask, 9 mL of methanol was added to the flask. Then, the resulting solution was ultrasonically treated for 120 minutes, and cooled to a room temperature (25° C.). Methanol was added to this solution to a volume of 10 mL, whereby a sample solution 1 was prepared. Then, 1 mL of the sample solution 1 was put in a 10-mL measuring flask, and diluted with methanol to a volume of 10 mL, whereby a sample solution 2 was prepared.

The sample solution 1 or the sample solution 2 was filtered by a PTFE filter (0.45 μm), and the resulting solution was used as a measurement solution for the LC/MS/MS analysis.

[LC/MS/MS Measurement Conditions]
LC system: LC-20A (available from Shimadzu Corporation)
Mass spectrometer: API4000 (AB/MDS Sciex)
Analysis column: Scherzo SM-C18 (3.0×75 mm, 3 μm)
Column temperature: 45° C.
Mobile phase: A. 10 mmol/L ammonium acetate aqueous solution
B. Methanol
Time program: 0.0 to 5.0 minutes B (%)=30% to 95%
5.0 to 10.0 minutes B (%)=95%
10.1 to 15.0 minutes B (%)=30%
Flow rate: 0.4 mL/min.
Switch valve: 2.0 to 6.0 minutes to MS
Injection amount: 5 μL
Ionization: ESI method
Detection: Negative ion detection (SRM method)
Ion monitoring: Q1=147.0 to Q3=102.9 (CE: −15 eV)

In the above time program, "%" means vol. %.

A detection cinnamic acid concentration was calculated based on a peak area value detected by the LC/MS/MS analysis and the calibration line prepared by using the standard solutions, and the cinnamic acid content of the EVOH composition pellets was calculated based on the detection concentration.

(4) Alkali Metal Content of Pellets

First, 2 g of the EVOH composition pellets were put on a platinum dish. Then, several milliliters of sulfuric acid was added to the dish, and the EVOH composition pellets were heated by a gas burner. After it was confirmed that the pellets were carbonized and sulfuric acid fume was no longer observed, several droplets of sulfuric acid were added to the dish, and the EVOH composition pellets were further heated. This process was repeated until organic compounds were burned out for complete ashing. After the ashing, the dish was allowed to stand for cooling, and the resulting ash was dissolved in 1 mL of hydrochloric acid. The resulting hydrochloric acid solution was thoroughly washed and diluted with highly purified water to a volume of 50 mL. The alkali metal content of the resulting sample solution was determined by means of an inductively coupled plasma emission spectrometer (ICP-AES) (720-ES Model available from Agilent Technologies, Inc.) Finally, the alkali metal concentration of the solution was converted into the alkali metal content of the EVOH composition pellets of the sample. Where the alkali metal compound was directly added to the surfaces of the EVOH pellets, the amount of the added alkali metal compound on a metal basis was regarded as the alkali metal content.

(5) Sorbic Acid Content (Conjugated Polyene Content) of Pellets

The EVOH composition pellets were freeze-pulverized, and 8 mL of an extraction solvent having a methanol/water volume ratio of methanol/water=1/1 was added to 1 g of the resulting EVOH composition. The resulting solution was ultrasonically treated still at a temperature of 20° C. for 1 hour, whereby sorbic acid was extracted from the resin. The resulting solution was cooled, and then diluted with the extraction solvent to a volume of 10 mL. The resulting solution was filtered, and then analyzed by a liquid chromatograph/UV spectrophotometer, whereby the amount of sorbic acid contained in the extraction solution was determined.

[HPLC Measurement Conditions]
LC system: Agilent 1260/1290 (available from Agilent Technologies, Inc.)
Detector: Agilent 1260 infinity diode array detector (available from Agilent Technologies, Inc.)
Column: Cadenza CD-C18 (100×3.0 mm, 3 μm) (available from Imtakt Corporation
Column Temperature: 40° C.
Mobile phase A: Aqueous solution containing 0.05% formic acid and 5% acetonitrile
Mobile phase B: Aqueous solution containing 0.05% formic acid and 95% acetonitrile
Time program: 0.0 to 5.0 minutes B (%)=30%
  5.0 to 8.0 minutes B (%)=30% to 50%
  8.0 to 10.0 minutes B (%)=50%
  10.0 to 13.0 minutes B (%)=50% to 30%
  13.0 to 15.0 minutes B (%)=30%
Flow rate: 0.2 mL/minute
UV detection wavelength: 190 to 400 nm
Quantitative wavelength: 262 nm The sorbic acid amount of the resulting solution was converted into the sorbic acid content of the EVOH composition pellets. In the HPLC measurement conditions, "%" means vol. %.

(6) Lubricant Content of Pellets

Where the lubricant was directly added to the surfaces of the EVOH pellets, the amount of the added lubricant was regarded as the lubricant content.

(7) Alkali Earth Metal Content of Pellets

Where the alkali earth metal was directly added to the surfaces of the EVOH pellets, the amount of the added alkali earth metal on a metal basis was regarded as the alkali earth metal content of the EVOH composition pellets. Where the alkali earth metal was present within the EVOH composition pellets, the alkali earth metal content was determined in the following manner. First, 2 g of the EVOH composition pellets were put on a platinum dish. Then, several milliliters of sulfuric acid was added to the dish, and the EVOH composition pellets were heated by a gas burner. After it was confirmed that the pellets were carbonized and sulfuric acid fume was no longer observed, several droplets of sulfuric acid were added to the dish, and the EVOH composition pellets were further heated. This process was repeated until organic compounds were burned out for complete ashing. After the ashing, the dish was allowed to stand for cooling, and the resulting ash was dissolved in 1 mL of hydrochloric acid. The resulting hydrochloric acid solution was thoroughly washed and diluted with highly purified water to a volume of 50 mL. The alkali earth metal content of the resulting sample solution was determined by means of an inductively coupled plasma emission spectrometer (ICP-AES) (720-ES Model available from Agilent Technologies, Inc.) Finally, the alkali earth metal concentration of the sample solution was converted into the alkali earth metal content of the EVOH composition pellets.

(8) Water Content (%) of Pellets

A volatile content was determined based on the weights of the EVOH pellets before and after drying at a temperature of 150° C. for 5 hours, and the volatile content was regarded as the water content of the EVOH pellets. More specifically, the water content was calculated from the following expression. This measurement/evaluation method was applied to the EVOH pellets, the surface boron-unadjusted EVOH pellets, and the EVOH composition pellets.

Water content (%)=[(Weight of EVOH pellets before drying−Weight of EVOH pellets after drying)/Weight of EVOH pellets before drying]×100

(9) Fisheyes

A single-layer film having a thickness of 30 μm was formed from the EVOH composition pellets under the following conditions:
(Film Forming Conditions)
Extruder: Having a diameter (D) of 40 mm and L/D of 28
Screw: Full flight type having a compression ratio of 2.5
Screen pack: 60/90/60 mesh
Die: Coat hanger type having a width of 450 mm
Temperature setting: C1/C2/C3/C4/A/D=190/200/210/210/210° C.
Screw rotation speed: 20 rpm
Roll temperature: 80° C.

The number of fisheyes present in the 30-μm thick single-layer film was measured by means of a digital defect inspecting apparatus (GX-70LT available from Mamiya-OP Co., Ltd.)

The number of the fisheyes was determined by applying light from a lower side of the single-layer film and counting the number of light non-transmissive parts (having a diameter of 0.1 to 0.2 mm) per 100 cm$^2$ (10 cm×10 cm).

For the measurement, the reading speed was 3 m/minute

《(A) Examples Using Cinnamic Acid Component as Fisheye-Suppressing Component》

Example 1

A solution (kept at 60° C. and having an EVOH concentration of 40%) prepared by dissolving an EVOH (having an ethylene content of 44 mol %, a saponification degree of 99.6 mol %, and an MFR of 3.8 g/10 minutes (measured at 210° C. with a load of 2160 g)) in a water/methanol mixed solvent (having a weight ratio of water/methanol=20/80) was extruded into a strand form in a water bath containing water kept at 5° C., and the resulting strands were solidified and cut by a cutter, whereby cylindrical pellets (each having a diameter of 4 mm and a length of 4 mm) were produced. Then, the EVOH pellets were fed into warm water at 30° C., and stirred for 4 hours. Thus, porous EVOH pellets having a water content of 50% were produced.

Then, 100 parts of the porous EVOH pellets were fed into 200 parts of a 0.0054% boric acid aqueous solution, and stirred at 30° C. for 5 hours. After the stirring, surface boron-unadjusted porous EVOH pellets were yielded.

The surface boron-unadjusted EVOH pellets were dried to a water content of 20% in a fluid bed dryer of batch tower type by passing nitrogen gas at 75° C. through the fluid bed dryer for 3 hours.

Then, the surface boron-unadjusted EVOH pellets were further dried to a water content of 0.3% in a ventilation dryer of batch box type by passing nitrogen gas at 125° C. through the ventilation dryer for 18 hours.

After the drying, the surface boron-unadjusted EVOH pellets produced in the aforementioned manner were subjected to the following rinsing process.

That is, 5 parts of the dried surface-boron-unadjusted EVOH pellets and 10 parts of a water/methanol mixed solvent (having a weight ratio of water/methanol=1/1) as a rinsing liquid were fed into a stainless steel container, and stirred at 35° C. for 1 hour. Thereafter, the pellets were taken out, and dried at 120° C. in a nitrogen stream for 16 hours. Thus, boron compound-incorporated EVOH pellets were produced.

The overall boron compound content, the surface boron compound content, and the water content of the boron compound-incorporated EVOH pellets thus produced were measured by the aforementioned methods. The overall boron compound content (on a boron basis) was 128.8 ppm, and the surface boron compound content (on a boron basis) was 1.1 ppm (the water content was 0.10%).

Cinnamic acid was dry-blended with the boron compound-incorporated EVOH pellets to a cinnamic acid content of 0.03%. Thus, EVOH composition pellets having a boron compound content and a cinnamic acid content thus adjusted were produced.

A 30-μm thick single-layer film was formed from the thus produced EVOH composition pellets by the aforementioned method by means of a single-layer T-die extruder controlled at a maximum temperature of 210° C. with a screw rotation speed of 20 rpm. The number of fisheyes occurring in the single-layer film was determined by the aforementioned method. The results are shown in Table 1.

Examples 2 and 3

EVOH composition pellets were produced in substantially the same manner as in Example 1, except that the overall boron compound content, the surface boron compound content, and the cinnamic acid content were adjusted as shown below in Table 1. The overall boron compound content and the surface boron compound content of the EVOH composition pellets thus produced were measured (the water content was 0.15% in Example 2, and 0.15% in Example 3).

Then, single-layer films were respectively formed from the pellets of Examples 2 and 3 in the same manner as in Example 1, and evaluated for the occurrence of fisheyes. The results are shown below in Table 1.

Comparative Example 1

EVOH composition pellets were produced in substantially the same manner as in Example 1, except that water was used as the rinsing liquid. The overall boron compound content and the surface boron compound content of the EVOH composition pellets thus produced were measured (the water content was 0.13%).

Then, a single-layer film was formed from the pellets in the same manner as in Example 1, and evaluated for the occurrence of fisheyes. The results are shown below in Table 1.

Comparative Example 2

EVOH composition pellets were produced in substantially the same manner as in Example 1, except that the rinsing with the rinsing liquid was not performed and cinnamic acid was not used. The overall boron compound content and the surface boron compound content of the EVOH composition pellets thus produced were measured (the water content was 0.09%).

Then, a single-layer film was formed from the pellets in the same manner as in Example 1, and evaluated for the occurrence of fisheyes. The results are shown below in Table 1.

Comparative Examples 3 and 4

EVOH composition pellets were produced in substantially the same manner as in Example 1, except that the cinnamic acid content was adjusted as shown below in Table 1. The overall boron compound content and the surface boron compound content of the EVOH composition pellets thus produced were measured (the water content was 0.10% in Comparative Examples 3 and 4).

Then, single-layer films were respectively formed from the pellets of Comparative Examples 3 and 4 in the same manner as in Example 1, and evaluated for the occurrence of fisheyes. The results are shown below in Table 1.

TABLE 1

| | Boron compound | | | | |
| --- | --- | --- | --- | --- | --- |
| | Surface content (ppm) | Overall content (ppm) | Surface content/ Overall content | Cinnamic acid content (wt. %) | Fisheyes/ 100 cm$^2$ |
| Example 1 | 1.1 | 128.8 | $0.85 \times 10^{-2}$ | 0.03 | 5 |
| Example 2 | 1.4 | 220 | $0.64 \times 10^{-2}$ | 0.001 | 5 |
| Example 3 | 1.4 | 220 | $0.64 \times 10^{-2}$ | 0.01 | 10 |
| Comparative Example 1 | 1.8 | 129.5 | $1.39 \times 10^{-2}$ | 0.03 | 15 |
| Comparative Example 2 | 2.3 | 130 | $1.77 \times 10^{-2}$ | 0 | 25 |
| Comparative Example 3 | 1.1 | 128.8 | $0.85 \times 10^{-2}$ | 0.1 | 14 |
| Comparative Example 4 | 1.1 | 128.8 | $0.85 \times 10^{-2}$ | 0 | 13 |

The EVOH composition pellets of Examples 1 to 3 each having a surface boron compound content of not higher than 1.7 ppm on a boron basis based on the weight of the pellets and a cinnamic acid content of 0.0001 to 0.05 wt. % based on the weight of the overall pellets are capable of significantly suppressing the occurrence of the fisheyes as compared with Comparative Examples.

«(B) Examples Using Alkali Metal as Fisheye-Suppressing Component»

Example 4

A solution (kept at 60° C. and having an EVOH concentration of 40%) prepared by dissolving an EVOH (having an ethylene content of 44 mol %, a saponification degree of 99.6 mol %, and an MFR of 3.8 g/10 minutes (measured at 210° C. with a load of 2160 g)) in a water/methanol mixed solvent (having a weight ratio of water/methanol=20/80) was extruded into a strand form in a water bath containing water kept at 5° C., and the resulting strands were solidified and then cut by a cutter, whereby cylindrical pellets (each having a diameter of 4 mm and a length of 4 mm) were produced. Then, the EVOH pellets were fed into warm water at 30° C., and stirred for 4 hours. Thus, porous EVOH pellets having a water content of 50% were produced.

Then, 100 parts of the EVOH pellets were fed into 200 parts of an aqueous solution containing 0.0054% of boric acid and 0.0407% of sodium acetate, and stirred at 30° C. for 5 hours. Thus, alkali-metal-incorporated surface-boron-unadjusted EVOH pellets were yielded.

The alkali-metal-incorporated surface-boron-unadjusted EVOH pellets were dried to a water content of 20% in a fluid bed dryer of batch tower type by passing nitrogen gas at 75° C. through the fluid bed dryer for 3 hours.

Then, the alkali-metal-incorporated surface-boron-unadjusted EVOH pellets were further dried to a water content of 0.3% in a ventilation dryer of batch box type by passing nitrogen gas at 125° C. through the ventilation dryer for 18 hours.

After the drying, the alkali-metal-incorporated surface-boron-unadjusted EVOH pellets produced in the aforementioned manner were subjected to the following rinsing process.

That is, 5 parts of the dried alkali-metal-incorporated surface-boron-unadjusted EVOH pellets and 10 parts of a water/methanol mixed solvent (having a weight ratio of water/methanol=3/7) as a rinsing liquid were fed into a stainless steel container, and stirred at 35° C. for 1 hour. Thereafter, the pellets were taken out, and dried at 120° C. in a nitrogen stream for 16 hours. Thus, EVOH composition pellets were produced.

The overall boron compound content, the surface boron compound content, the alkali metal content, and the water content of the EVOH composition pellets thus produced were measured by the aforementioned measurement/evaluation method. The overall boron compound content (on a boron basis) was 128.8 ppm, and the surface boron compound content (on a boron basis) was 1.1 ppm. The alkali metal content was 240 ppm, and the water content was 0.13 wt. %.

A 30-μm thick single-layer film was formed from the thus produced EVOH composition pellets by means of a single-layer T-die extruder controlled at a maximum temperature of 210° C. with a screw rotation speed of 20 rpm. The number of fisheyes occurring in the single-layer film was determined by the aforementioned measurement/evaluation method.

Example 5

EVOH composition pellets were produced in substantially the same manner as in Example 4, except that the water/methanol weight ratio of the rinsing liquid was changed to water/methanol=1/1 and the alkali metal content was adjusted as shown below in Table 2. The overall boron compound content, the surface boron compound content, and the alkali metal content of the EVOH composition pellets thus produced were measured (the water content was 0.10%).

Then, a single-layer film was formed from the pellets in the same manner as in Example 4, and evaluated for the occurrence of fisheyes. The results are shown below in Table 2.

Example 6

EVOH composition pellets were produced in substantially the same manner as in Example 5, except that the alkali metal content was adjusted as shown below in Table 2. The overall boron compound content, the surface boron compound content, and the alkali metal content of the EVOH composition pellets thus produced were measured (the water content was 0.15%).

Then, a single-layer film was formed from the pellets in the same manner as in Example 4, and evaluated for the occurrence of fisheyes. The results are shown below in Table 2.

Comparative Example 5

EVOH composition pellets were produced in substantially the same manner as in Example 4, except that the rinsing liquid was changed to water. The overall boron compound content, the surface boron compound content, and the alkali metal content of the EVOH composition pellets were measured (the water content was 0.13%).

Then, a single-layer film was formed from the pellets in the same manner as in Example 4, and evaluated for the occurrence of fisheyes. The results are shown below in Table 2.

Comparative Example 6

EVOH composition pellets were produced in substantially the same manner as in Example 4, except that the rinsing with the rinsing liquid was not performed. The overall boron compound content, the surface boron compound content, and the alkali metal content of the EVOH composition pellets were measured (the water content was 0.09%).

Then, a single-layer film was formed from the pellets in the same manner as in Example 4, and evaluated for the occurrence of fisheyes. The results are shown below in Table 2.

Comparative Example 7

EVOH composition pellets were produced in substantially the same manner as in Example 5, except that the alkali metal content was adjusted as shown below in Table 2. The overall boron compound content, the surface boron compound content, and the alkali metal content of the EVOH composition pellets thus produced were measured (the water content was 0.09%).

Then, a single-layer film was formed from the pellets in the same manner as in Example 4, and evaluated for the occurrence of fisheyes. The results are shown below in Table 2.

TABLE 2

| | Boron compound | | | Alkali | |
| | Surface content (ppm) | Overall content (ppm) | Surface content/ Overall content | metal content (ppm) | Fisheyes/ 100 cm$^2$ |
| --- | --- | --- | --- | --- | --- |
| Example 4 | 1.1 | 128.8 | $0.85 \times 10^{-2}$ | 240 | 3 |
| Example 5 | 1.1 | 128.8 | $0.85 \times 10^{-2}$ | 160 | 9 |
| Example 6 | 1.4 | 220 | $0.64 \times 10^{-2}$ | 250 | 15 |
| Comparative Example 5 | 1.8 | 129.5 | $1.39 \times 10^{-2}$ | 240 | 22 |
| Comparative Example 6 | 2.3 | 130 | $1.77 \times 10^{-2}$ | 240 | 25 |
| Comparative Example 7 | 1.1 | 128.8 | $0.85 \times 10^{-2}$ | 1000 | 2112 |

The EVOH composition pellets of Examples 4 to 6 each having a surface boron compound content of not higher than 1.7 ppm on a boron basis based on the weight of the pellets and an alkali metal content of not higher than 500 ppm based on the weight of the pellets are capable of significantly suppressing the occurrence of the fisheyes as compared with Comparative Examples.

«(C) Examples Using Conjugated Polyene as Fisheye-Suppressing Component»

Example 7

Ethylene and vinyl acetate were polymerized, and then a methanol solution of sorbic acid as a conjugated polyene was added to the resulting ethylene-vinyl acetate copolymer methanol paste, so that the sorbic acid content of the EVOH was adjusted as shown below in Table 3. The EVOH paste containing sorbic acid was saponified, whereby a conjugated polyene-incorporated EVOH (having an ethylene content of 44 mol %, a saponification degree of 99.6 mol %, and an MFR of 3.8 g/10 minutes (measured at 210° C. with a load of 2160 g)) was prepared. A solution (kept at 60° C. and having an EVOH concentration of 40%) prepared by dissolving the conjugated polyene-incorporated EVOH in a water/methanol mixed solvent (having a weight ratio of water/methanol=20/80) was extruded into a strand form in a water bath containing water kept at 5° C., and the resulting strands were solidified and then cut by a cutter, whereby cylindrical pellets (each having a diameter of 4 mm and a length of 4 mm) were produced. Subsequently, the conjugated polyene-incorporated EVOH pellets were fed into warm water at 30° C., and stirred for 4 hours. Thus, conjugated polyene-incorporated porous EVOH pellets having a water content of 50% were produced.

Then, 100 parts of the conjugated polyene-incorporated porous EVOH pellets were fed into 200 parts of a 0.0054% boric acid aqueous solution, and stirred at 30° C. for 5 hours. After the stirring, conjugated-polyene-incorporated surface-boron-unadjusted EVOH pellets were yielded.

The conjugated-polyene-incorporated surface-boron-unadjusted EVOH pellets were dried to a water content of 20% in a fluid bed dryer of batch tower type bypassing nitrogen gas at 75° C. through the fluid bed dryer for 3 hours.

Then, the conjugated-polyene-incorporated surface-boron-unadjusted EVOH pellets were further dried to a water content of 0.3% in a ventilation dryer of batch box type by passing nitrogen gas at 125° C. through the ventilation dryer for 18 hours.

After the drying, the conjugated-polyene-incorporated surface-boron-unadjusted EVOH pellets produced in the aforementioned manner were subjected to the following rinsing process.

That is, 5 parts of the dried conjugated-polyene-incorporated surface-boron-unadjusted EVOH pellets and 10 parts of a water/methanol mixed solvent (having a weight ratio of water/methanol=1/1) as a rinsing liquid were fed into a stainless steel container, and stirred at 35° C. for 1 hour. Thereafter, the pellets were taken out, and dried at 120° C. in a nitrogen stream for 16 hours. Thus, EVOH composition pellets were produced.

The overall boron compound content, the surface boron compound content, and the conjugated polyene content of the EVOH composition pellets thus produced were measured. The overall boron compound content (on a boron basis) was 128.8 ppm, and the surface boron compound content (on a boron basis) was 1.1 ppm. The sorbic acid (conjugated polyene) content was 0.0478%, and the water content was 0.10%.

A 30-μm thick single-layer film was formed from the thus produced EVOH composition pellets by means of a single-layer T-die extruder controlled at a maximum temperature of 210° C. with a screw rotation speed of 20 rpm. The number of fisheyes occurring in the single-layer film was determined by the aforementioned measurement/evaluation method. The results are shown below in Table 3.

Examples 8 and 9

EVOH composition pellets were produced in substantially the same manner as in Example 7, except that the overall boron compound content, the surface boron compound content, and the conjugated polyene content were adjusted as shown below in Table 3. The overall boron compound content and the surface boron compound content of the EVOH composition pellets thus produced were measured (the water content was 0.18% in Example 8, and 0.18% in Example 9).

Then, single-layer films were respectively formed from the pellets of Examples 8 and 9 in the same manner as in Example 7, and evaluated for the occurrence of fisheyes. The results are shown below in Table 3.

Comparative Example 8

EVOH composition pellets were produced in substantially the same manner as in Example 7, except that the rinsing liquid was changed to water and the sorbic acid (conjugated polyene) content was adjusted as shown below in Table 3. The overall boron compound content, the surface boron compound content, and the sorbic acid (conjugated polyene) content of the EVOH composition pellets thus produced were measured (the water content was 0.13%).

Then, a single-layer film was formed from the pellets in the same manner as in Example 7, and evaluated for the occurrence of fisheyes. The results are shown below in Table 3.

Comparative Example 9

EVOH composition pellets were produced in substantially the same manner as in Example 7, except that the rinsing with the rinsing liquid was not performed and the sorbic acid (conjugated polyene) content was adjusted as shown below in Table 3. The overall boron compound content, the surface boron compound content, and the sorbic acid (conjugated polyene) content of the EVOH composition pellets thus produced were measured (the water content was 0.090).

Then, a single-layer film was formed from the pellets in the same manner as in Example 7, and evaluated for the occurrence of fisheyes. The results are shown below in Table 3.

Comparative Example 10

EVOH composition pellets were produced in substantially the same manner as in Example 7, except that the sorbic acid (conjugated polyene) content was adjusted as shown below in Table 3. The overall boron compound content, the surface boron compound content, and the sorbic acid (conjugated polyene) content of the EVOH composition pellets thus produced were measured (the water content was 0.100).

Then, a single-layer film was formed from the pellets in the same manner as in Example 7, and evaluated for the occurrence of fisheyes. The results are shown below in Table 3.

TABLE 3

| | Boron compound | | | Sorbic acid content (wt. %) | Fisheyes/ 100 cm² |
|---|---|---|---|---|---|
| | Surface content (ppm) | Overall content (ppm) | Surface content/ Overall content | | |
| Example 7 | 1.1 | 128.8 | $0.85 \times 10^{-2}$ | 0.0478 | 9 |
| Example 8 | 0.7 | 150 | $0.47 \times 10^{-2}$ | 0.03 | 6 |
| Example 9 | 0.7 | 150 | $0.47 \times 10^{-2}$ | 0.01 | 11 |
| Comparative Example 8 | 1.8 | 129.5 | $1.39 \times 10^{-2}$ | 0.0478 | 17 |
| Comparative Example 9 | 2.3 | 130 | $1.77 \times 10^{-2}$ | 0.009 | 25 |
| Comparative Example 10 | 1.1 | 128.8 | $0.85 \times 10^{-2}$ | 0.1 | 21 |

The EVOH composition pellets of Examples 7 to 9 each having a surface boron compound content of not higher than 1.7 ppm on a boron basis based on the weight of the pellets and a conjugated polyene content of not higher than 0.06 wt. % based on the weight of the overall pellets are capable of significantly suppressing the occurrence of the fisheyes as compared with Comparative Examples.

«(D) Examples Using Lubricant as Fisheye-Suppressing Component»

Example 10

A solution (kept at 60° C. and having an EVOH concentration of 40%) prepared by dissolving an EVOH (having an ethylene content of 44 mol %, a saponification degree of 99.6 mol %, and an MFR of 3.8 g/10 minutes (measured at 210° C. with a load of 2160 g)) in a water/methanol mixed solvent (having a weight ratio of water/methanol=20/80) was extruded into a strand form in a water bath containing water kept at 5° C., and the resulting strands were solidified and then cut by a cutter, whereby cylindrical pellets (each having a diameter of 4 mm and a length of 4 mm) were produced. Then, the EVOH pellets were fed into warm water at 30° C., and stirred for 4 hours. Thus, porous EVOH pellets having a water content of 50% were produced.

Subsequently, 100 parts of the porous EVOH pellets were fed into 200 parts of a 0.0054% boric acid aqueous solution, and stirred at 30° C. for 5 hours. After the stirring, surface boron-unadjusted EVOH pellets were yielded.

The surface boron-unadjusted EVOH pellets were dried to a water content of 20% in a fluid bed dryer of batch tower type by passing nitrogen gas at 75° C. through the fluid bed dryer for 3 hours.

Then, the surface boron-unadjusted EVOH pellets were further dried to a water content of 0.3% in a ventilation dryer of batch box type by passing nitrogen gas at 125° C. through the ventilation dryer for 18 hours. After the drying, the surface boron-unadjusted EVOH pellets had an overall boron compound content of 130 ppm as measured by the aforementioned measurement/evaluation method.

The dried surface-boron-unadjusted EVOH pellets (having a water content of 0.3% and an overall boron compound content of 130 ppm) produced in the aforementioned manner were subjected to the following rinsing process.

That is, 5 parts of the dried surface-boron-unadjusted EVOH pellets and 10 parts of a water/methanol mixed solvent (having a weight ratio of water/methanol=1/1) as a rinsing liquid were fed into a stainless steel container, and stirred at 35° C. for 1 hour. Thereafter, the pellets were taken out, and dried at 120° C. in a nitrogen stream for 16 hours. Thus, boron compound-incorporated EVOH pellets were produced.

Subsequently, a lubricant (ethylene bis-stearamide ALFLOW H-50T available from NOF corporation) was added at a concentration of 0.0054% to the boron compound-incorporated EVOH pellets, and homogeneously mixed with the boron compound-incorporated EVOH pellets by shaking.

The overall boron compound content and the surface boron compound content of the EVOH composition pellets thus produced were measured by the aforementioned measurement/evaluation method. The overall boron compound content was 128.8 ppm, and the surface boron compound content was 1.1 ppm (the water content was 0.10%).

A 30-µm thick single-layer film was formed from the thus produced EVOH composition pellets by means of a single-layer T-die extruder controlled at a maximum temperature of 210° C. with a screw rotation speed of 20 rpm. The number of fisheyes occurring in the single-layer film was determined by the aforementioned measurement/evaluation method. The results are shown below in Table 4.

Examples 11 and 12

EVOH composition pellets were produced in substantially the same manner as in Example 10, except that the lubricant content of the EVOH composition pellets was adjusted as shown below in Table 4 (the water content was 0.10% in Examples 11 and 12).

Then, single-layer films were respectively formed from the pellets of Examples 11 and 12 in the same manner as in Example 10, and evaluated for the occurrence of fisheyes. The results are shown below in Table 4.

Example 13

EVOH composition pellets were produced in substantially the same manner as in Example 10, except that calcium stearate was used as the lubricant, and the overall boron compound content, the surface boron compound content, and the lubricant content were adjusted as shown below in Table 4. The overall boron compound content and the surface boron compound content of the EVOH composition pellets thus produced were measured (the water content was 0.15%).

Then, a single-layer film was formed from the pellets in the same manner as in Example 10, and evaluated for the occurrence of fisheyes. The results are shown below in Table 4.

Example 14

EVOH composition pellets were produced in substantially the same manner as in Example 10, except that magnesium stearate was used as the lubricant, and the overall boron compound content, the surface boron compound content, and the lubricant content were adjusted as shown in Table 4. The overall boron compound content and the surface boron compound content of the EVOH composition pellets thus produced were measured (the water content was 0.150).

Then, a single-layer film was formed from the pellets in the same manner as in Example 10, and evaluated for the occurrence of fisheyes. The results are shown below in Table 4.

Comparative Example 11

EVOH composition pellets were produced in substantially the same manner as in Example 10, except that the rinsing liquid was changed to water and the lubricant content was adjusted as shown below in Table 4. The overall boron compound content and the surface boron compound content of the EVOH composition pellets thus produced were measured (the water content was 0.13%).

Then, a single-layer film was formed from the pellets in the same manner as in Example 10, and evaluated for the occurrence of fisheyes. The results are shown below in Table 4.

Comparative Example 12

EVOH composition pellets were produced in substantially the same manner as in Example 10, except that the rinsing with the rinsing liquid was not performed and the lubricant was not used. The overall boron compound content and the surface boron compound content of the EVOH composition pellets thus produced were measured (the water content was 0.09%).

Then, a single-layer film was formed from the pellets in the same manner as in Example 10, and evaluated for the occurrence of fisheyes. The results are shown below in Table 4.

Comparative Examples 13 and 14

EVOH composition pellets were produced in substantially the same manner as in Example 10, except that the lubricant content was adjusted as shown below in Table 4. The overall boron compound content and the surface boron compound content of the EVOH composition pellets thus produced were measured (the water content was 0.10% in Comparative Examples 13 and 14).

Then, single-layer films were respectively formed from the pellets of Comparative Examples 13 and 14 in the same manner as in Example 10, and evaluated for the occurrence of fisheyes. The results are shown below in Table 4.

Comparative Examples. In comparison between Example 11 and Comparative Example 11, it was confirmed that, even if the overall boron compound contents are substantially the same and the lubricant contents are the same, a significantly smaller number of fisheyes occur in the film formed from the pellets of Example 11 having a lower surface boron compound content.

«(E) Examples Using Alkali Earth Metal as Fisheye-Suppressing Component»

Example 15

A solution (kept at 60° C. and having an EVOH concentration of 40%) prepared by dissolving an EVOH (having an ethylene content of 44 mol %, a saponification degree of 99.6 mol %, and an MFR of 3.8 g/10 minutes (measured at 210° C. with a load of 2160 g)) in a water/methanol mixed solvent (having a weight ratio of water/methanol=20/80) was extruded into a strand form in a water bath containing water kept at 5° C., and the resulting strands were solidified and then cut by a cutter, whereby cylindrical pellets (each having a diameter of 4 mm and a length of 4 mm) were produced. Then, the EVOH pellets were fed into warm water at 30° C., and stirred for 4 hours. Thus, porous EVOH pellets having a water content of 50% were produced.

Subsequently, 100 parts of the porous EVOH pellets were fed into 200 parts of a 0.0054% boric acid aqueous solution, and stirred at 30° C. for 5 hours. After the stirring, surface boron-unadjusted EVOH pellets were yielded.

The surface boron-unadjusted EVOH pellets were dried to a water content of 20% in a fluid bed dryer of batch tower type by passing nitrogen gas at 75° C. through the fluid bed dryer for 3 hours.

Then, the surface boron-unadjusted EVOH pellets were further dried to a water content of 0.3% in a ventilation dryer of batch box type by passing nitrogen gas at 125° C. through the ventilation dryer for 18 hours.

The dried surface-boron-unadjusted EVOH pellets produced in the aforementioned manner were subjected to the following rinsing process.

TABLE 4

| | | Boron compound | | | | |
|---|---|---|---|---|---|---|
| | Type of lubricant | Surface content (ppm) | Overall content (ppm) | Surface content/ Overall content | Lubricant content (wt. %) | Fisheyes/ 100 cm$^2$ |
| Example 10 | Ethylene bis-stearamide | 1.1 | 128.8 | $0.85 \times 10^{-2}$ | 0.0054 | 5 |
| Example 11 | Ethylene bis-stearamide | 1.1 | 128.8 | $0.85 \times 10^{-2}$ | 0.03 | 3 |
| Example 12 | Ethylene bis-stearamide | 1.1 | 128.8 | $0.85 \times 10^{-2}$ | 0.1 | 4 |
| Example 13 | Calcium stearate | 1.4 | 220 | $0.64 \times 10^{-2}$ | 0.003 | 2 |
| Example 14 | Magnesium stearate | 1.4 | 220 | $0.64 \times 10^{-2}$ | 0.003 | 3 |
| Comparative Example 11 | Ethylene bis-stearamide | 1.8 | 129.5 | $1.39 \times 10^{-2}$ | 0.03 | 22 |
| Comparative Example 12 | — | 2.3 | 130 | $1.77 \times 10^{-2}$ | 0 | 25 |
| Comparative Example 13 | Ethylene bis-stearamide | 1.1 | 128.8 | $0.85 \times 10^{-2}$ | 0.3 | 156 |
| Comparative Example 14 | — | 1.1 | 128.8 | $0.85 \times 10^{-2}$ | 0 | 13 |

The EVOH composition pellets of Examples 10 to 14 each having a surface boron compound content of not higher than 1.7 ppm and a lubricant content of 0.001 to 0.15 wt. % based on the weight of the pellets are capable of significantly suppressing the occurrence of the fisheyes as compared with That is, 5 parts of the dried surface-boron-unadjusted EVOH pellets and 10 parts of a water/methanol mixed solvent (having a weight ratio of water/methanol=1/1) were fed into a stainless steel container, and stirred at 35° C. for 1 hour. Thereafter, the pellets were taken out, and dried at 120° C. in a nitrogen stream for 16 hours. Thus, boron compound-incorporated EVOH pellets were produced.

Calcium bis(dihydrogenphosphate) monohydrate was added as an alkali earth metal in a calcium amount of 30 ppm to the boron compound-incorporated EVOH pellets, and homogeneously mixed with the boron compound-incorporated EVOH pellets by shaking. Thus, EVOH composition pellets were produced.

The overall boron compound content, the surface boron compound content, the alkali earth metal content, and the water content of the EVOH composition pellets thus produced were measured. The overall boron compound content (on a boron basis) was 128.8 ppm, and the surface boron compound content (on a boron basis) was 1.1 ppm. The alkali earth metal content was 30 ppm, and the water content was 0.10 wt. %.

A 30-μm thick single-layer film was formed from the thus produced EVOH composition pellets containing the boron compound and the alkali earth metal by means of a single-layer T-die extruder controlled at a maximum temperature of 210° C. with a screw rotation speed of 20 rpm. The number of fisheyes occurring in the single-layer film was determined by the aforementioned measurement/evaluation method. The results are shown below in Table 5.

Comparative Example 15

EVOH composition pellets were produced in substantially the same manner as in Example 15, except that the rinsing liquid was changed to water. The overall boron compound content, the surface boron compound content, and the alkali earth metal content of the EVOH composition pellets thus produced were measured (the water content was 0.13%).

Then, a single-layer film was formed from the pellets in the same manner as in Example 15, and evaluated for the occurrence of fisheyes. The results are shown below in Table 5.

Comparative Example 16

EVOH composition pellets were produced in substantially the same manner as in Example 15, except that the rinsing with the rinsing liquid was not performed and the alkali earth metal content was adjusted as shown below in Table 5. The overall boron compound content, the surface boron compound content, and the alkali earth metal content of the EVOH composition pellets thus produced were measured (the water content was 0.10%).

Then, a single-layer film was formed from the pellets in the same manner as in Example 15, and evaluated for the occurrence of fisheyes. The results are shown below in Table 5.

TABLE 5

| | Boron compound | | | Alkali earth metal content (ppm) | Fisheyes/ 100 cm$^2$ |
|---|---|---|---|---|---|
| | Surface content (ppm) | Overall content (ppm) | Surface content/ Overall content | | |
| Example 15 | 1.1 | 128.8 | $0.85 \times 10^{-2}$ | 30 | 135 |
| Comparative Example 15 | 1.8 | 129.5 | $1.39 \times 10^{-2}$ | 30 | 205 |
| Comparative Example 16 | 2.3 | 130 | $1.77 \times 10^{-2}$ | 300 | 2259 |

The EVOH composition pellets of Example 15 having a surface boron compound content of not higher than 1.7 ppm on a boron basis based on the weight of the pellets and an alkali earth metal content of not higher than 100 ppm based on the weight of the pellets are capable of significantly suppressing the occurrence of the fisheyes as compared with Comparative Examples 15 and 16.

While specific forms of the embodiments of the present disclosure have been shown in the aforementioned examples, the examples are merely illustrative of the disclosure but not limitative of the disclosure. It is contemplated that various modifications apparent to those skilled in the art could be made within the scope of the disclosure.

The EVOH composition pellets of the present disclosure, which have a reduced boron compound content in their pellet surface portions and contain a predetermined amount of the fisheye-suppressing component, can improve the appearance of a formed product without deterioration in formability. Therefore, the EVOH composition pellets of the present disclosure are advantageously applicable to a packaging material application field that needs to satisfy a stricter appearance requirement than the application field of the conventional EVOH pellets.

The invention claimed is:

1. An ethylene-vinyl alcohol copolymer composition pellet comprising
   an ethylene-vinyl alcohol copolymer;
   a boron compound; and
   at least one component selected from the group consisting of:
   (A) 0.0001 to 0.05 wt. % of a cinnamic acid component based on a weight of the ethylene-vinyl alcohol copolymer composition pellet;
   (B) 10 to 500 ppm of an alkali metal based on the weight of the ethylene-vinyl alcohol copolymer composition pellet;
   (C) 0.001 to 0.06 wt. % of a conjugated polyene based on the weight of the ethylene-vinyl alcohol copolymer composition pellet;
   (D) 0.001 to 0.15 wt. % of a lubricant based on the weight of the ethylene-vinyl alcohol copolymer composition pellet; and
   (E) 1 to 100 ppm of an alkaline earth metal based on the weight of the ethylene-vinyl alcohol copolymer composition pellet,
   wherein pellet surface portions of the ethylene-vinyl alcohol copolymer composition pellet have a boron compound content of not higher than 1.7 ppm on a boron basis based on the weight of the ethylene-vinyl alcohol copolymer composition pellet;
   wherein an overall boron compound content of the ethylene-vinyl alcohol copolymer composition pellet is 10 to 1,000 ppm on a boron basis based on the weight of the ethylene-vinyl alcohol copolymer composition pellet; and
   wherein a weight ratio (surface boron compound content/ overall boron compound content) between the boron compound content of the pellet surface portions of the ethylene-vinyl alcohol copolymer composition pellet on a boron basis and the overall boron compound content of the ethylene-vinyl alcohol copolymer composition pellet on a boron basis is not higher than $1.38 \times 10^{-2}$.

2. The ethylene-vinyl alcohol copolymer composition pellet according to claim 1, wherein the boron compound content of the pellet surface portions of the ethylene-vinyl alcohol copolymer composition pellet is determined by immersing 4 g of the ethylene-vinyl alcohol copolymer composition pellet in 20 mL of methanol at 30° C. in a stationary state for 6 hours, and dividing the boron compound content dissolved in a solution of the methanol by the weight of the ethylene-vinyl alcohol copolymer composition pellet.

3. The ethylene-vinyl alcohol copolymer composition pellet according to claim 1, which has a water content of 0.01 to 1 wt. %.

4. A method for producing an ethylene-vinyl alcohol copolymer composition pellet, comprising:
bringing a pellet of an ethylene-vinyl alcohol copolymer into contact with a boron compound to incorporate the boron compound to the ethylene-vinyl alcohol copolymer pellet;
rinsing the boron compound-incorporated ethylene-vinyl alcohol copolymer pellet so that pellet surface portions of the ethylene-vinyl alcohol copolymer composition pellet have a boron compound content of not higher than 1.7 ppm on a boron basis based on a weight of the ethylene-vinyl alcohol copolymer composition pellet; an overall boron compound content of the ethylene-vinyl alcohol copolymer composition pellet is 10 to 1,000 ppm on a boron basis based on the weight of the ethylene-vinyl alcohol copolymer composition pellet; and a weight ratio (surface boron compound content/overall boron compound content) between the boron compound content of the pellet surface portions of the ethylene-vinyl alcohol copolymer composition pellet on a boron basis and the overall boron compound content of the ethylene-vinyl alcohol copolymer composition pellet on a boron basis is not higher than $1.38 \times 10^{-2}$, and at least one action selected from the group consisting of:
(A') bringing the ethylene-vinyl alcohol copolymer pellet into contact with a cinnamic acid component so that the ethylene-vinyl alcohol copolymer composition pellet has a cinnamic acid component content of 0.0001 to 0.05 wt. % based on the weight of the ethylene-vinyl alcohol copolymer composition pellet;
(B') bringing the ethylene-vinyl alcohol copolymer pellet into contact with an alkali metal so that the ethylene-vinyl alcohol copolymer composition pellet has an alkali metal content of 10 to 500 ppm based on the weight of the ethylene-vinyl alcohol copolymer composition pellet;
(C') bringing the ethylene-vinyl alcohol copolymer pellet into contact with a conjugated polyene so that the ethylene-vinyl alcohol copolymer composition pellet has a conjugated polyene content of 0.001 to 0.06 wt. % based on the weight of the ethylene-vinyl alcohol copolymer composition pellet;
(D') bringing the ethylene-vinyl alcohol copolymer pellet into contact with a lubricant so that the ethylene-vinyl alcohol copolymer composition pellet has a lubricant content of 0.001 to 0.15 wt. % based on the weight of the ethylene-vinyl alcohol copolymer composition pellet; and
(E') bringing the ethylene-vinyl alcohol copolymer pellet into contact with an alkaline earth metal so that the ethylene-vinyl alcohol copolymer composition pellet has an alkaline earth metal content of 1 to 100 ppm based on the weight of the ethylene-vinyl alcohol copolymer composition pellet,
wherein the boron compound-incorporated ethylene-vinyl alcohol copolymer pellet, after being dried, is brought into contact with a water/alcohol mixed solution containing water and an alcohol in a water-to-alcohol weight ratio (water/alcohol) of 80/20 to 0/100 or into contact with the alcohol in the rinsing of the boron compound-incorporated ethylene-vinyl alcohol copolymer pellet;
and thereby forming a pellet according to claim 1.

5. An ethylene-vinyl alcohol copolymer composition pellet comprising:
an ethylene-vinyl alcohol copolymer;
a boron compound; and
at least one component selected from the group consisting of:
(A) 0.0001 to 0.05 wt. % of a cinnamic acid component based on a weight of the ethylene-vinyl alcohol copolymer composition pellet;
(B) 10 to 500 ppm of an alkali metal based on the weight of the ethylene-vinyl alcohol copolymer composition pellet;
(C) 0.001 to 0.06 wt. % of a conjugated polyene based on the weight of the ethylene-vinyl alcohol copolymer composition pellet;
(D) 0.001 to 0.15 wt. % of a lubricant based on the weight of the ethylene-vinyl alcohol copolymer composition pellet; and
(E) 1 to 100 ppm of an alkaline earth metal based on the weight of the ethylene-vinyl alcohol copolymer composition pellet,
wherein pellet surface portions of the ethylene-vinyl alcohol copolymer composition pellet have a boron compound content of not higher than 1.7 ppm on a boron basis based on the weight of the ethylene-vinyl alcohol copolymer composition pellet; and
wherein a weight ratio (surface boron compound content/overall boron compound content) between the boron compound content of the pellet surface portions of the ethylene-vinyl alcohol copolymer composition pellet on a boron basis and the overall boron compound content of the ethylene-vinyl alcohol copolymer composition pellet on a boron basis is from $1 \times 10^{-7}$ to $1.38 \times 10^{-2}$.

6. The ethylene-vinyl alcohol copolymer composition pellet according to claim 5, wherein the boron compound content of the pellet surface portions of the ethylene-vinyl alcohol copolymer composition pellet is determined by immersing 4 g of the ethylene-vinyl alcohol copolymer composition pellet in 20 mL of methanol at 30° C. in a stationary state for 6 hours, and dividing the boron compound content dissolved in a solution of the methanol by the weight of the ethylene-vinyl alcohol copolymer composition pellet.

7. The ethylene-vinyl alcohol copolymer composition pellet according to claim 5, which have an overall boron compound content of 10 to 1,000 ppm on a boron basis based on the weight of the ethylene-vinyl alcohol copolymer composition pellet.

8. The ethylene-vinyl alcohol copolymer composition pellet according to claim 5, which has a water content of 0.01 to 1 wt. %.

9. A method for producing an ethylene-vinyl alcohol copolymer composition pellet, comprising:
bringing a pellet of an ethylene-vinyl alcohol copolymer into contact with a boron compound to incorporate the boron compound to the ethylene-vinyl alcohol copolymer pellet;
rinsing the boron compound-incorporated ethylene-vinyl alcohol copolymer pellet so that pellet surface portions of the ethylene-vinyl alcohol copolymer composition pellet have a boron compound content of not higher than 1.7 ppm on a boron basis based on a weight of the ethylene-vinyl alcohol copolymer composition pellet; and a weight ratio (surface boron compound content/overall boron compound content) between the boron compound content of the pellet surface portions of the ethylene-vinyl alcohol copolymer composition pellet on a boron basis and the overall boron compound content of the ethylene-vinyl alcohol copolymer composition pellet on a boron basis is from $1 \times 10^{-7}$ to $1.38 \times 10^{-2}$, and at least one action selected from the group consisting of:
(A') bringing the ethylene-vinyl alcohol copolymer pellet into contact with a cinnamic acid component so that the ethylene-vinyl alcohol copolymer composition pellet has a cinnamic acid component content of 0.0001 to 0.05 wt. % based on the weight of the ethylene-vinyl alcohol copolymer composition pellet;
(B') bringing the ethylene-vinyl alcohol copolymer pellet into contact with an alkali metal so that the ethylene-vinyl alcohol copolymer composition pellet has an alkali metal content of 10 to 500 ppm based on the weight of the ethylene-vinyl alcohol copolymer composition pellet;
(C') bringing the ethylene-vinyl alcohol copolymer pellet into contact with a conjugated polyene so that the ethylene-vinyl alcohol copolymer composition pellet has a conjugated polyene content of 0.001 to 0.06 wt. % based on the weight of the ethylene-vinyl alcohol copolymer composition pellet;
(D') bringing the ethylene-vinyl alcohol copolymer pellet into contact with a lubricant so that the ethylene-vinyl alcohol copolymer composition pellet has a lubricant content of 0.001 to 0.15 wt. % based on the weight of the ethylene-vinyl alcohol copolymer composition pellet; and
(E') bringing the ethylene-vinyl alcohol copolymer pellet into contact with an alkaline earth metal so that the ethylene-vinyl alcohol copolymer composition pellet has an alkaline earth metal content of 1 to 100 ppm based on the weight of the ethylene-vinyl alcohol copolymer composition pellet, wherein the boron compound-incorporated ethylene-vinyl alcohol copolymer pellet, after being dried, is brought into contact with a water/alcohol mixed solution containing water and an alcohol in a water-to-alcohol weight ratio (water/alcohol) of 80/20 to 0/100 or into contact with the alcohol in the rinsing of the boron compound-incorporated ethylene-vinyl alcohol copolymer pellet;

and thereby forming a pellet according to claim 5.

* * * * *